(12) United States Patent
Kusumba et al.

(10) Patent No.: US 10,587,211 B2
(45) Date of Patent: Mar. 10, 2020

(54) LINEAR COMPRESSOR AND METHODS OF POLARITY DETECTION

(71) Applicants: Haier US Appliance Solutions, Inc., Wilmington, DE (US); University of Louisville Research Foundation, Inc., Louisville, KY (US)

(72) Inventors: Srujan Kusumba, Louisville, KY (US); Gregory William Hahn, Louisville, KY (US); Joseph Wilson Latham, Louisville, KY (US); Michael Lee McIntyre, Louisville, KY (US)

(73) Assignees: Haier US Appliance Solutions, Inc., Wilmington, DE (US); University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 15/951,253

(22) Filed: Apr. 12, 2018

(65) Prior Publication Data
US 2019/0319558 A1    Oct. 17, 2019

(51) Int. Cl.
| H02P 6/00 | (2016.01) |
| F04B 35/04 | (2006.01) |
| F04B 49/06 | (2006.01) |
| H02P 6/17 | (2016.01) |
| H02P 6/34 | (2016.01) |

(52) U.S. Cl.
CPC ............ *H02P 6/006* (2013.01); *F04B 35/045* (2013.01); *F04B 49/065* (2013.01); *H02P 6/17* (2016.02); *H02P 6/34* (2016.02); *F04B 2203/0402* (2013.01)

(58) Field of Classification Search
CPC ....................................................... H02P 6/006
See application file for complete search history.

(56) References Cited

U.S. PATENT DOCUMENTS

| 4,198,743 A | 4/1980 | Stuber |
| 9,086,062 B2 | 7/2015 | Filippa et al. |
| 2008/0224645 A1* | 9/2008 | Ide ........................... H02P 21/18 318/608 |
| 2016/0215770 A1* | 7/2016 | Kusumba .............. F04B 49/065 |

FOREIGN PATENT DOCUMENTS

| JP | 5522139 B2 | 6/2014 |
| KR | 186147 B1 | 5/1999 |

* cited by examiner

*Primary Examiner* — Kawing Chan
*Assistant Examiner* — Bradley R Brown
(74) *Attorney, Agent, or Firm* — Dority & Manning, P.A.

(57) ABSTRACT

A linear compressor and methods of operation, for example, to detect polarity for the linear compressor are provided herein. The method may include supplying an initial time varying voltage to the motor of the linear compressor at an assumed polarity; estimating a first acceleration of the motor of the linear compressor when the motor is at a bottom dead center position; estimating a second acceleration of the motor of the linear compressor when the motor is at a top dead center position; comparing the first acceleration to the second acceleration; and determining whether the assumed polarity is correct based on the comparison.

16 Claims, 12 Drawing Sheets

LINEAR COMPRESSOR AND METHODS OF POLARITY DETECTION

FIELD OF THE INVENTION

The present subject matter relates generally to linear compressors, such as linear compressors for refrigerator appliances.

BACKGROUND OF THE INVENTION

Certain refrigerator appliances include sealed systems for cooling chilled chambers of the refrigerator appliances. The sealed systems generally include a compressor that generates compressed refrigerant during operation of the sealed systems. The compressed refrigerant flows to an evaporator where heat exchange between the chilled chambers and the refrigerant cools the chilled chambers and food items located therein.

Recently, certain refrigerator appliances have included linear compressors for compressing refrigerant. Linear compressors generally include a piston and a driving coil. The driving coil receives a current that generates a force for oscillating the piston (i.e., sliding the piston forward and backward within a chamber having a cylinder head). An elastic element, such as a spring, may be provided to aid in such oscillation. During motion of the piston within the chamber, the piston compresses refrigerant. Generally, the force of gas compression acts to push the piston away from the chamber and cylinder head.

Motion of the piston within the chamber may be controlled such that the piston does not crash against another component of the linear compressor during motion of the piston within the chamber. Such head crashing can damage various components of the linear compressor, such as the piston or an associated cylinder. Nonetheless, the net positive force of gas compression may act to shift or offset the center of equilibrium for oscillation. Such an offset may cause the elastic element to extend more in one oscillation direction (e.g., a positive direction away from the chamber) than in the opposite oscillation direction (e.g., a negative direction toward the chamber). In some instances, the imbalanced extension of the elastic element and the piston may increase the fatigue (e.g., fatigue loading) of certain elements within the linear compressor. Moreover, the rate of part failure may increase and operational life may decrease.

Although unbalanced extension and increased fatigue (e.g., through extreme or excessive spring extension) is preferably avoided, it can be difficult to determine a position of the piston and magnitude of displacement within the chamber. For example, a stroke length of the piston is dependent upon a variety of parameters of the linear compressor, and such parameters can vary. Determining a stroke length or position of the piston can be especially difficult if the linear compressor is inadvertently wired in an opposite direction from the direction intended by the manufacturer (e.g., such that polarity of the voltage and current within the linear compressor is reversed). In addition, utilizing a sensor to measure the stroke length of the piston can require sensor wires to pierce a hermetically sealed shell of the linear compressor. Passing the sensor wires through the shell provides a path for contaminants to enter the shell. Moreover, utilizing a sensor may present other challenges, such as sensitivity to electrical noise, increased costs, and the potential for sensor failure that may contribute to in failure of the linear compressor.

Accordingly, it would be useful to provide a linear compressor and method of operation for addressing one or more of the above-identified issues. In particular, a linear compressor and method for determining or addressing the polarity of a supplied voltage and current would be especially advantageous.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a linear compressor is provided. The method may include supplying an initial time varying voltage to the motor of the linear compressor at an assumed polarity; estimating a first acceleration of the motor of the linear compressor when the motor is at a bottom dead center position; estimating a second acceleration of the motor of the linear compressor when the motor is at a top dead center position; comparing the first acceleration to the second acceleration; determining whether the assumed polarity is correct based on the comparison; and halting the supplying of the initial time varying voltage in response to determining the assumed polarity is not correct.

In another exemplary aspect of the present disclosure, a method of operating a linear compressor is provided. The method may include supplying an initial time varying voltage to the motor of the linear compressor at an assumed polarity; estimating a first acceleration of the motor of the linear compressor when the motor is at a bottom dead center position; estimating a second acceleration of the motor of the linear compressor when the motor is at a top dead center position; comparing the first acceleration to the second acceleration; determining whether the assumed polarity is correct based on the comparison; and halting the supplying of the initial time varying voltage in response to determining the assumed polarity is not correct. Determining the assumed polarity is correct may include determining the first acceleration diverges from the second acceleration by less than a set margin of error. Determining the assumed polarity is not correct may include determining the first acceleration diverges from the second acceleration by at least the set margin of error.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
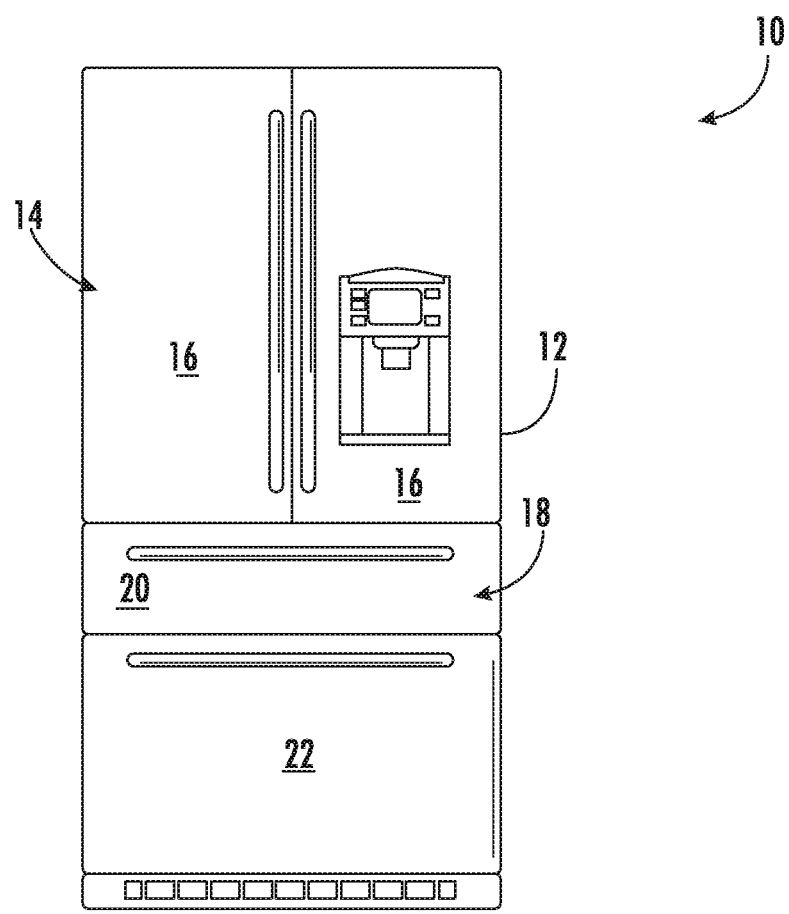
FIG. 1 is a front elevation view of a refrigerator appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
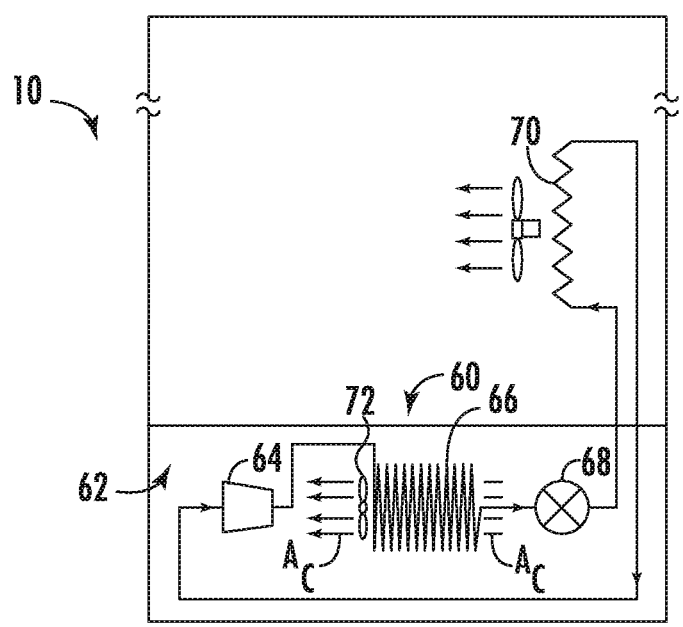
FIG. 2 is schematic view of certain components of the exemplary refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
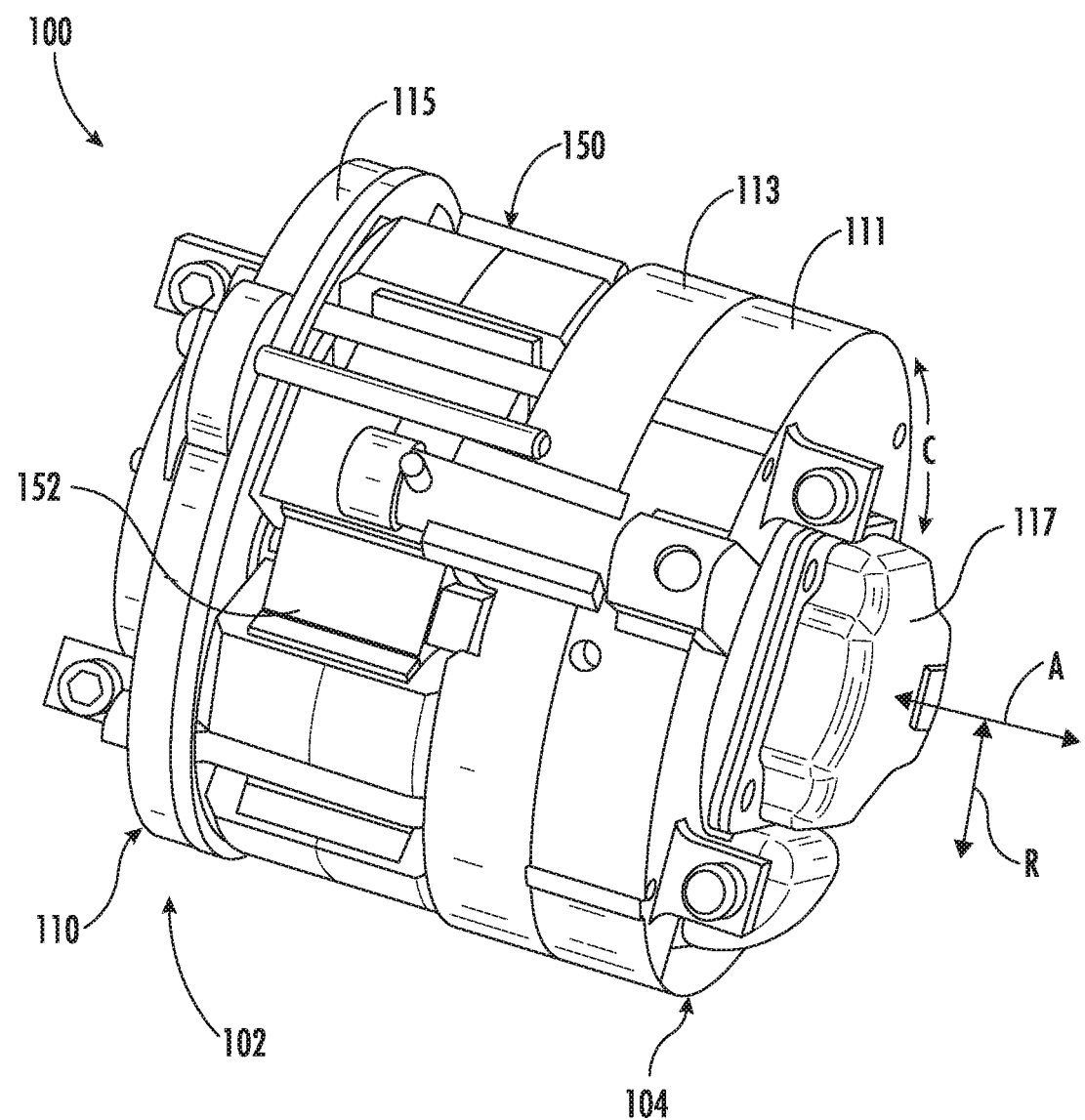
FIG. 3 provides a perspective view of a linear compressor according to an exemplary embodiment of the present disclosure.
Figure 4:
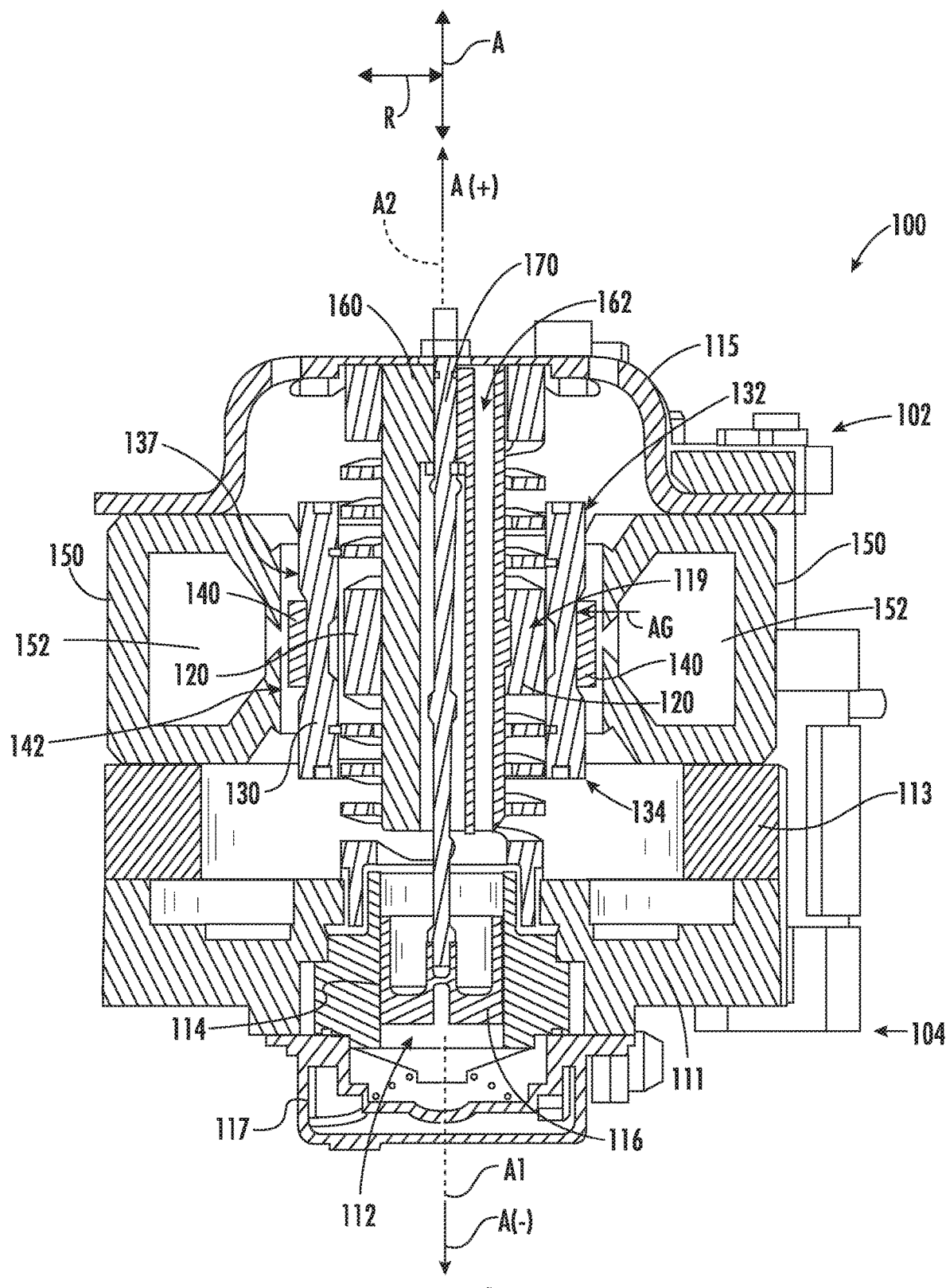
FIG. 4 provides a side section view of the exemplary linear compressor of FIG. 3.
Figure 5:
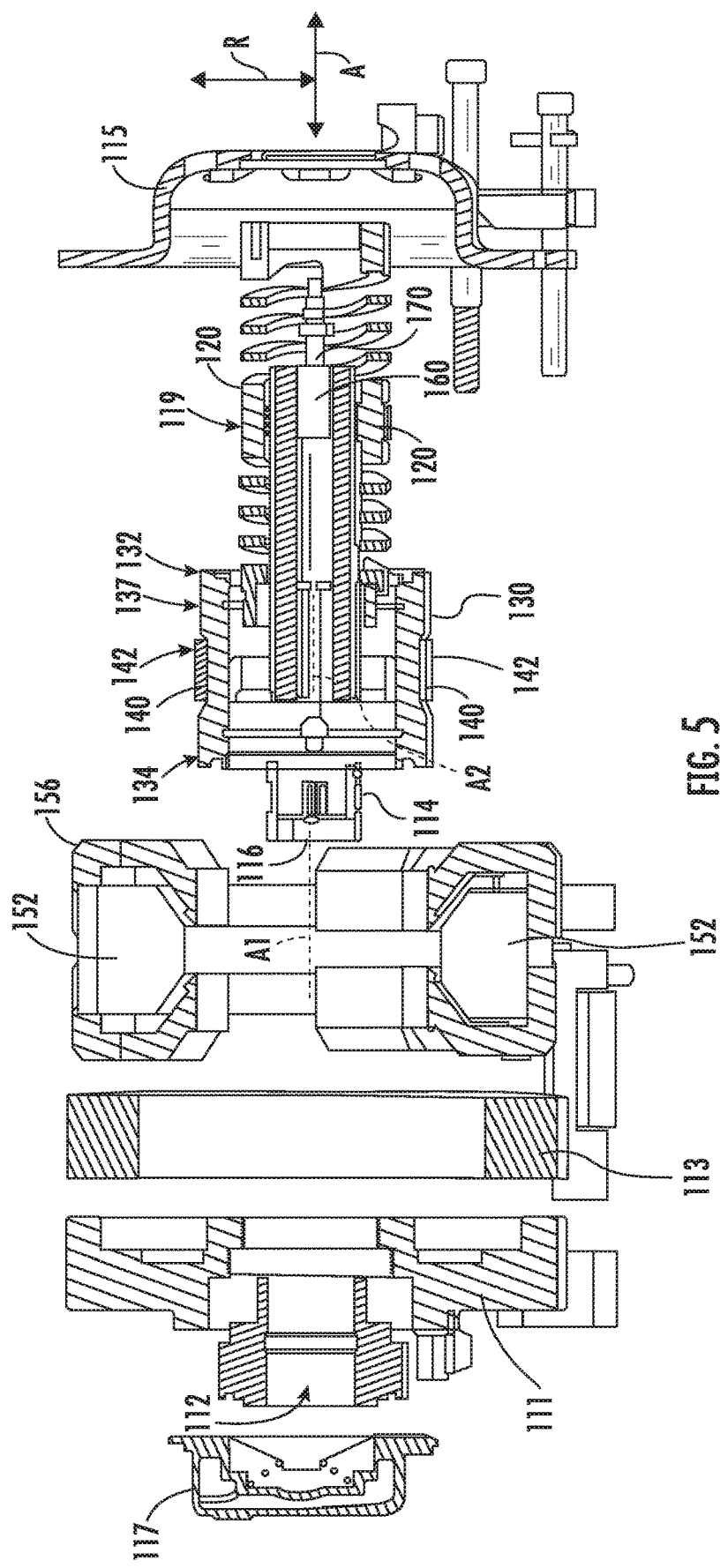
FIG. 5 provides an exploded view of the exemplary linear compressor of FIG. 4.

FIG. 3 provides a perspective view of a linear compressor 100 according to an exemplary embodiment of the present disclosure. FIG. 4 provides a side section view of linear compressor 100. FIG. 5 provides an exploded side section view of linear compressor 100. As discussed in greater detail below, linear compressor 100 is operable to increase a pressure of fluid within a chamber 112 of linear compressor 100. Linear compressor 100 may be used to compress any suitable fluid, such as refrigerant or air. In particular, linear compressor 100 may be used in a refrigerator appliance, such as refrigerator appliance 10 (FIG. 1) in which linear compressor 100 may be used as compressor 64 (FIG. 2). As may be seen in FIG. 3, linear compressor 100 defines an axial direction A, a radial direction R, and a circumferential direction C. Linear compressor 100 may be enclosed within a hermetic or air-tight shell (not shown). The hermetic shell can, e.g., hinder or prevent refrigerant from leaking or escaping from refrigeration system 60.

Turning now to FIG. 4, linear compressor 100 includes a casing 110 that extends between a first end portion 102 and a second end portion 104, e.g., along the axial direction A. Casing 110 includes various static or non-moving structural components of linear compressor 100. In particular, casing 110 includes a cylinder assembly 111 that defines a chamber 112. Cylinder assembly 111 is positioned at or adjacent second end portion 104 of casing 110. Chamber 112 extends longitudinally along the axial direction A. Casing 110 also includes a motor mount mid-section 113 and an end cap 115 positioned opposite each other about a motor. A stator, e.g., including an outer back iron 150 and a driving coil 152, of the motor is mounted or secured to casing 110, e.g., such that the stator is sandwiched between motor mount mid-section 113 and end cap 115 of casing 110. Linear compressor 100 also includes valves (such as a discharge valve assembly 117 at an end of chamber 112) that permit refrigerant to enter and exit chamber 112 during operation of linear compressor 100.

A piston assembly 114 with a piston head 116 is slidably received within chamber 112 of cylinder assembly 111. In particular, piston assembly 114 is slidable along a first axis A1 within chamber 112. The first axis A1 may include a negative axial direction A(−) and a positive axial direction A(+), and may be substantially parallel to the axial direction A. Thus, piston assembly 114 may alternately slide or oscillate, e.g., the piston head 116, in the negative axial direction A(−) and the positive axial direction A(+). During sliding of piston head 116 within chamber 112, piston head 116 compresses refrigerant within chamber 112. As an example, from a top dead center position (i.e., top dead center point), piston head 116 can slide within chamber 112 towards a bottom dead center position (i.e., bottom dead center point) along the negative axial direction A(−), i.e., an expansion stroke of piston head 116. When piston head 116 reaches the bottom dead center position, piston head 116 changes directions and slides in chamber 112 along the positive axial direction A(+) back towards the top dead center position, i.e., a compression stroke of piston head 116. It should be understood that linear compressor 100 may include an additional piston head and/or additional chamber at an opposite end of linear compressor 100. Thus, linear compressor 100 may have multiple piston heads in alternative exemplary embodiments.

Linear compressor 100 also includes an inner back iron assembly 130. Inner back iron assembly 130 is positioned in the stator of the motor. In particular, outer back iron 150 and/or driving coil 152 may extend about inner back iron assembly 130, e.g., along the circumferential direction C. Inner back iron assembly 130 extends between a first end portion 132 and a second end portion 134, e.g., along the axial direction A.

Inner back iron assembly 130 also has an outer surface 137. At least one driving magnet 140 is mounted to inner back iron assembly 130, e.g., at outer surface 137 of inner back iron assembly 130. Driving magnet 140 may face and/or be exposed to driving coil 152. In particular, driving magnet 140 may be spaced apart from driving coil 152, e.g., along the radial direction R by an air gap AG. Thus, the air gap AG may be defined between opposing surfaces of driving magnet 140 and driving coil 152. Driving magnet 140 may also be mounted or fixed to inner back iron assembly 130 such that an outer surface 142 of driving magnet 140 is substantially flush with outer surface 137 of inner back iron assembly 130. Thus, driving magnet 140 may be inset within inner back iron assembly 130. In such a manner, the magnetic field from driving coil 152 may have to pass through only a single air gap (e.g., air gap AG) between outer back iron 150 and inner back iron assembly 130 during operation of linear compressor 100, and linear compressor 100 may be more efficient than linear compressors with air gaps on both sides of a driving magnet.

As may be seen in FIG. 4, driving coil 152 extends about inner back iron assembly 130, e.g., along the circumferential direction C. Driving coil 152 is operable to move the inner back iron assembly 130 along a second axis A2 during operation of driving coil 152. The second axis A2 may be substantially parallel to the axial direction A and/or the first axis A1. As an example, driving coil 152 may receive a current from a current source (not shown) in order to generate a magnetic field that engages driving magnet 140 and urges piston assembly 114 to move along the axial direction A in order to compress refrigerant within chamber 112 as described above and will be understood by those skilled in the art. In particular, the magnetic field of driving coil 152 may engage driving magnet 140 in order to move inner back iron assembly 130 along the second axis A2 and piston head 116 along the first axis A1 during operation of driving coil 152. Thus, driving coil 152 may slide piston assembly 114 between the top dead center position and the bottom dead center position, e.g., by moving inner back iron assembly 130 along the second axis A2, during operation of driving coil 152.

A piston flex mount 160 is mounted to and extends through inner back iron assembly 130. A coupling 170 extends between piston flex mount 160 and piston assembly 114, e.g., along the axial direction A. Thus, coupling 170 connects inner back iron assembly 130 and piston assembly 114 such that motion of inner back iron assembly 130, e.g., along the axial direction A or the second axis A2, is transferred to piston assembly 114. Piston flex mount 160 defines an input passage 162 that permits refrigerant to flow therethrough.

Linear compressor 100 may include various components for permitting and/or regulating operation of linear compressor 100. In particular, linear compressor 100 includes a controller (not shown) that is configured for regulating operation of linear compressor 100. The controller is in, e.g., operative, communication with the motor, e.g., driving coil 152 of the motor. Thus, the controller may selectively activate driving coil 152, e.g., by supplying current to driving coil 152, in order to compress refrigerant with piston assembly 114 as described above.

The controller includes memory and one or more processing devices such as microprocessors, CPUs or the like, such as general or special purpose microprocessors operable to execute programming instructions or micro-control code associated with operation of linear compressor 100. The memory can represent random access memory such as DRAM, or read only memory such as ROM or FLASH. The processor executes programming instructions stored in the memory. The memory can be a separate component from the processor or can be included onboard within the processor. Alternatively, the controller may be constructed without using a microprocessor, e.g., using a combination of discrete analog and/or digital logic circuitry (such as switches, amplifiers, integrators, comparators, flip-flops, AND gates, field programmable gate arrays (FPGA), and the like) to perform control functionality instead of relying upon software.

Linear compressor 100 also includes a spring assembly 120. Spring assembly 120 is positioned in inner back iron assembly 130. In particular, inner back iron assembly 130 may extend about spring assembly 120, e.g., along the circumferential direction C. Spring assembly 120 also extends between first and second end portions 102 and 104 of casing 110, e.g., along the axial direction A. Spring assembly 120 assists with coupling inner back iron assembly 130 to casing 110, e.g., cylinder assembly 111 of casing 110. In particular, inner back iron assembly 130 is fixed to spring assembly 120 at a middle portion 119 of spring assembly 120.

During operation of driving coil 152, spring assembly 120 supports inner back iron assembly 130. In particular, inner back iron assembly 130 is suspended by spring assembly 120 within the stator or the motor of linear compressor 100 such that motion of inner back iron assembly 130 along the radial direction R is hindered or limited while motion along the second axis A2 is relatively unimpeded. Thus, spring assembly 120 may be substantially stiffer along the radial direction R than along the axial direction A. In such a manner, spring assembly 120 can assist with maintaining a uniformity of the air gap AG between driving magnet 140 and driving coil 152, e.g., along the radial direction R, during operation of the motor and movement of inner back iron assembly 130 on the second axis A2. Spring assembly 120 can also assist with hindering side pull forces of the motor from transmitting to piston assembly 114 and being reacted in cylinder assembly 111 as a friction loss.

Figure 6:
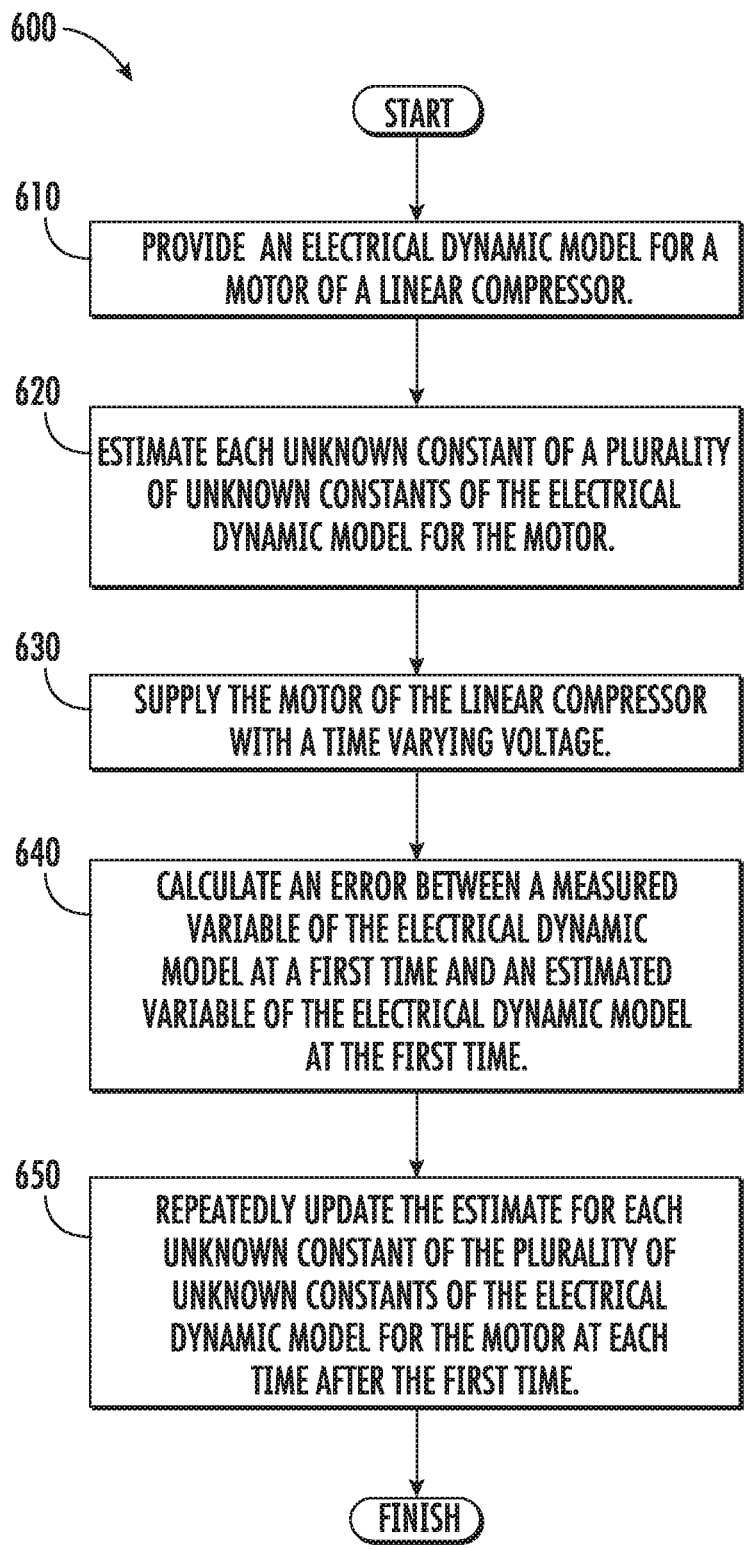
FIG. 6 provides a flow chart illustrating a method for operating a linear compressor according to an exemplary embodiment of the present disclosure.

FIG. 6 illustrates a method 600 for operating a linear compressor according to an exemplary embodiment of the present disclosure. Method 600 may be used to operate any suitable linear compressor. For example, method 600 may be used to operate linear compressor 100 (FIG. 3). Thus, method 600 is discussed in greater detail below with reference to linear compressor 100. Utilizing method 600 various mechanical and electrical parameters or constants of linear compressor 100 may be established or determined. For example, method 600 may assist with determining or establishing a spring constant of spring assembly 120, a motor force constant of the motor of linear compressor 100, a damping coefficient of linear compressor 100, a resistance of the motor of linear compressor 100, an inductance of the motor of linear compressor 100, a moving mass (such as mass of piston assembly 114 and inner back iron assembly 130) of linear compressor 100, etc. Knowledge of such mechanical and electrical parameters or constants of linear compressor 100 may improve performance or operation of linear compressor 100, as will be understood by those skilled in the art.

At step 610, an electrical dynamic model for the motor of linear compressor 100 is provided. Any suitable electrical dynamic model for the motor of linear compressor 100 may be provided at step 610. For example, the electrical dynamic model for the motor of linear compressor 100 may be $$\frac{di}{dt} = \frac{v_a}{L_i} - \frac{r_i i}{L_i} - \frac{\alpha \dot{x}}{L_i}$$

where $v_a$ is a voltage across the motor of linear compressor 100;
$r_i$ is a resistance of the motor of linear compressor 100;
i is a current through the motor of linear compressor 100;
α is a motor force constant;
$\dot{x}$ is a velocity of the motor of linear compressor 100; and
$L_i$ is an inductance of the motor of linear compressor 100.

The electrical dynamic model for the motor of linear compressor 100 includes a plurality of unknown constants. In the example provided above, the plurality of unknown constants of the electrical dynamic model for the motor of linear compressor 100 includes the resistance of the motor of linear compressor 100 (e.g., the resistance of driving coil 152), the inductance of the motor of linear compressor 100 (e.g., the inductance of driving coil 152), and the motor force constant. Knowledge or accurate estimates of such unknown constants can improve operation of linear compressor 100, e.g., by permitting operation of linear compressor 100 at a resonant frequency without head crashing and/or while preventing part fatigue (e.g., extreme or excessive part fatigue loading).

At step 610, the electrical dynamic model for the motor of linear compressor 100 may also be solved for a particular variable, such as di/dt in the example provided above. Thus, as an example, the electrical dynamic model for the motor of linear compressor 100 may be provided in parametric form as $$\Phi \triangleq W \theta_e$$

where $$W \triangleq [\, v_a \quad -i \quad -\dot{x} \,]; \text{ and}$$

$$\theta_e \triangleq \left[\, \frac{1}{L_i} \quad \frac{r_i}{L_i} \quad \frac{\alpha}{L_i} \,\right].$$

However, di/dt is difficult to accurately measure or determine. Thus, a filtering technique may be used to account for this signal and provide a useable or implementable signal. In particular, the electrical dynamic model for the motor of linear compressor 100 may be filtered, e.g., with a low-pass filter, to account for this signal. Thus, a filtered electrical dynamic model for the motor of linear compressor 100 may be provided as $$\Phi_f \triangleq W_f \theta_e.$$

In alternative exemplary embodiments, the electrical dynamic model for the motor of linear compressor 100 may be solved for $\dot{x}$ at step 610. Thus, the electrical dynamic model for the motor of linear compressor 100 may be provided in parametric form as $$\Phi \triangleq W \theta_e$$

where $$\Phi \triangleq \left[\frac{di}{dt}\right];$$

$$W \triangleq \left[\, v_a \quad -i \quad -\frac{di}{dt} \,\right]; \text{ and}$$

$$\theta_e \triangleq \left[\, \frac{1}{\alpha} \quad \frac{r_i}{\alpha} \quad \frac{L_i}{\alpha} \,\right].$$

Again, the electrical dynamic model for the motor of linear compressor 100 may be filtered, e.g., to account for di/dt.

At step 620, each unknown constant of the plurality of unknown constants of the electrical dynamic model for the motor of linear compressor 100 is estimated. For example, a manufacturer of linear compressor 100 may have a rough estimate or approximation for the value of each unknown constant of the plurality of unknown constants of the electrical dynamic model for the motor of linear compressor 100. Thus, such values of the each unknown constant of the plurality of unknown constants of the electrical dynamic model for the motor of linear compressor 100 may be provided at step 620 to estimate each unknown constant of the plurality of unknown constants of the electrical dynamic model for the motor of linear compressor 100.

At step 630, the motor (e.g., driving coil 152) of linear compressor 100 is supplied with a time varying voltage, e.g., by the controller of linear compressor 100. Any suitable time varying voltage may be supplied to the motor of linear compressor 100 at step 630. For example, the time varying voltage may have at least two frequencies components at step 630 when the electrical dynamic model for the motor of linear compressor 100 is solved for di/dt. Thus, the time varying voltage may be $$v_a(t) = v_0 [\sin(2\pi f_1 t) + \sin(2\pi f_2 t)]$$

where $v_a$ is a voltage across the motor of linear compressor 100;

$f_1$ is a first frequency; and $f_2$ is a second frequency.

The first and second frequencies $f_1$, $f_2$ may be about the resonant frequency of linear compressor 100. In particular, the first and second frequencies $f_1$, $f_2$ may be just greater than and just less than the resonant frequency of linear compressor 100, respectively. For example, the first frequency $f_1$ may be within five percent greater than the resonant frequency of linear compressor 100, and the second frequency $f_2$ may be within five percent less than the resonant frequency of linear compressor 100. In alternative exemplary embodiments, the time varying voltage may have a single frequency at step 630, e.g., when the electrical dynamic model for the motor of linear compressor 100 is solved for $\dot{x}$. When the time varying voltage has a single frequency at step 630, the gas force of fluid within linear compressor 100 may be incorporated within the model for the motor of linear compressor 100.

A time varying current through the motor of linear compressor 100 may also be determined, e.g., during step 630. An ammeter or any other suitable method or mechanism may be used to determine the time varying current through the motor of linear compressor 100. A velocity of the motor of linear compressor 100 may also be measured, e.g., during step 630. As an example, an optical sensor, a Hall effect sensor or any other suitable sensor may be positioned adjacent piston assembly 114 and/or inner back iron assembly 130 in order to permit such sensor to measure the velocity of the motor of linear compressor 100 at step 630. Thus, piston assembly 114 and/or inner back iron assembly 130 may be directly observed in order to measure the velocity of the motor of linear compressor 100 at step 630. In addition, a filtered first derivative of the current through the motor of linear compressor 100 with respect to time may also be measured or determined, e.g., during step 630. Accordingly, the values or filtered values of W may be measured during step 630. To permit such measuring, step 630 and the measurements described above may be conducted prior to sealing the motor of linear compressor 100 within a hermetic shell.

At step 640, an error between a measured variable (e.g., di/dt or $\dot{x}$) of the electrical dynamic model at a first time and an estimated variable of the electrical dynamic model at the first time is calculated. For example, an estimate of $\theta_e$, $\hat{\theta}_e$, is available, e.g., from step 620. An error between $\theta_e$ and $\hat{\theta}_e$ may be given as $$\tilde{\theta}_e \triangleq \theta_e - \hat{\theta}_e.$$

However, $\theta_e$ may be unknown while $\Phi_f$ is known or measured. Thus, a related error signal may be used at step 640. The related error signal may be given as $$\tilde{\Phi}_f \triangleq \Phi_f - \hat{\Phi}_f.$$

The related error signal along with $W_f$ may be used to update $\hat{\theta}_e$, as described in greater detail below.

At step 650, the estimate for each unknown constant of the plurality of unknown constants of the electrical dynamic model for the motor of linear compressor 100 are repeatedly updated at each time after the first time in order to reduce the error between a measured variable of the electrical dynamic model at each time after the first time and an estimated variable of the electrical dynamic model at each time after the first time. In particular, an adaptive least-squares algorithm may be utilized in order to drive the error between the measured value for the electrical dynamic model at each time after the first time and the estimated variable of the electrical dynamic model at each time after the first time towards zero. In particular, the Adaptive Least-Squares Update Law ensures that $$\tilde{\theta}_e(t) \to 0 \text{ as } t \to \infty:$$

$$\dot{\hat{\theta}}_e \triangleq -k_e \frac{P_e W_f^T \tilde{\Phi}_f}{1 + \gamma_e W_f P_e W_f^T},$$

$\hat{\theta}_e(t_0)$ is estimated, e.g., at step 620.

where $P_e(t) \in \Re^{3\times 3}$ is the covariance matrix $$\dot{P}_e \triangleq -k_e \frac{P_e W_f^T W_f P_e}{1 + \gamma_e W_f W_f^T}, P_e(t_0) = \rho_e I_3$$

where $k_e$, $\gamma_e$, $\rho_e \in \Re^1$ are constant gains.

From $\hat{\theta}_e$, estimates of each unknown constant of the plurality of unknown constants of the electrical dynamic model for the motor of linear compressor 100 may be given as $$\hat{\alpha} = \frac{\hat{\theta}_{e_3}}{\hat{\theta}_{e_1}}, \hat{R} = \frac{\hat{\theta}_{e_2}}{\hat{\theta}_{e_1}}, \hat{L} = \frac{1}{\hat{\theta}_{e_1}}$$

when the electrical dynamic model for the motor of linear compressor 100 is solved for di/dt at step 610 or $$\hat{\alpha} = \frac{1}{\hat{\theta}_{e_1}}, \hat{R} = \frac{\hat{\theta}_{e_2}}{\hat{\theta}_{e_1}}, \hat{L} = \frac{\hat{\theta}_{e_3}}{\hat{\theta}_{e_1}}$$

when the electrical dynamic model for the motor of linear compressor 100 is solved for $\dot{x}$ at step 610.

Generally, initial estimate provided for the electrical motor parameters of linear compressor 100 may be off an actual or previously determined value. However, the experimental electrical motor parameter estimates converge to the previously determined values over time.

With the unknown constants of the electrical dynamic model for the motor of linear compressor 100 suitably estimated, a final estimate for each unknown constant of the plurality of unknown constants of the electrical dynamic model for the motor of linear compressor 100 may be saved within the controller of linear compressor 100. The saved constant values may be used to facilitate efficient and/or proper operation of linear compressor 100. In particular, knowledge of the constants of the electrical dynamic model for the motor of linear compressor 100 may assist with operating linear compressor 100 at a resonant frequency while avoiding head crashing.

As discussed above, method 600 may also provide estimates of the mechanical parameters or constants of linear compressor 100. Thus, method 600 may also include providing a mechanical dynamic model for linear compressor 100. Any suitable mechanical dynamic model for linear compressor 100 may be provided. For example, the mechanical dynamic model for linear compressor 100 may be $$F_m = i(t) = \frac{M}{\alpha}\ddot{x} + \frac{C}{\alpha}\dot{x} + \frac{K}{\alpha}x$$

where

M is a moving mass of linear compressor 100;

α is a motor force constant;

$\ddot{x}$ is an acceleration of the motor of linear compressor 100;

C is a damping coefficient of linear compressor 100;

$\dot{x}$ is a velocity of the motor of linear compressor 100;

K is a spring stiffness of linear compressor 100; and x is a position of the moving mass of linear compressor 100.

The mechanical dynamic model for linear compressor 100 includes a plurality of unknown constants. In the example provided above, the plurality of unknown constants of the mechanical dynamic model of linear compressor 100 includes a moving mass of linear compressor 100 (e.g., a mass of piston assembly 114 and inner back iron assembly 130), a damping coefficient of linear compressor 100, and a spring stiffness of linear compressor 100 (e.g., a stiffness of spring assembly 120). Knowledge or accurate estimates of such unknown constants can improve operation of linear compressor 100, e.g., by permitting operation of linear compressor 100 at a resonant frequency without head crashing and/or while preventing part fatigue (e.g., extreme or excessive part fatigue loading).

The mechanical dynamic model for linear compressor 100 may also be solved for a particular variable, such as i(t) in the example provided above. Thus, as an example, the electrical dynamic model for the motor of linear compressor 100 may be provided in parametric form as $$\Psi \triangleq Y\theta_m$$

where $$\Psi \triangleq [i];$$

$$Y \triangleq [\ddot{x} \quad \dot{x} \quad x]; \text{ and}$$

$$\theta_m \triangleq \begin{bmatrix} \frac{M}{\alpha} & \frac{C}{\alpha} & \frac{K}{\alpha} \end{bmatrix}^T.$$

However, $\ddot{x}$ is difficult to accurately measure or determine. Thus, a filtering technique may be used to account for this signal and provide a measurable variable. In particular, the mechanical dynamic model for linear compressor 100 may be filtered, e.g., with a low-pass filter, to account for this signal. Thus, a filtered electrical dynamic model for the motor of linear compressor 100 may be provided as $$\Psi_f \triangleq Y_f \theta_m.$$

Each unknown constant of the plurality of unknown constants of the mechanical dynamic model for linear compressor 100 may also be estimated, and the motor (e.g., driving coil 152) of linear compressor 100 may be supplied with a time varying voltage, e.g., in the manner described above for steps 620 and 630.

An error between a measured variable of the mechanical dynamic model at the first time and an estimated variable of the mechanical dynamic model at the first time may also be calculated. For example, an estimate of $\theta_m$, $\hat{\theta}_m$, is available as discussed above. An error between $\theta_m$ and $\hat{\theta}_m$ may be given as $$\tilde{\theta}_m \triangleq \theta_m - \hat{\theta}_m.$$

However, $\theta_m$ may be unknown while $\Psi_f$ is known or measured. Thus, a related error signal may be used. The related error signal may be given as $$\tilde{\Psi}_f \triangleq \Psi_f - \hat{\Psi}_f.$$

The related error signal along with $Y_f$ may be used to update $\hat{\theta}_m$, as described in greater detail below.

The estimate for each unknown constant of the plurality of unknown constants of the mechanical dynamic model for linear compressor 100 are repeatedly updated at each time after the first time in order to reduce the error between a measured variable of the mechanical dynamic model at each time after the first time and an estimated variable of the mechanical dynamic model at each time after the first time. In particular, an adaptive least-squares algorithm may be utilized in order to drive the error between the measured value for the mechanical dynamic model at each time after the first time and the estimated variable of the mechanical dynamic model at each time after the first time towards zero. In particular, the Adaptive Least-Squares Update Law ensures that $$\tilde{\theta}_m(t) \to 0 \text{ as } t \to \infty:$$

$$\dot{\hat{\theta}}_m \triangleq -k_m \frac{P_m Y_f^T \tilde{\Psi}_f}{1 + \gamma_m Y_f P_m Y_f^T},$$

$\hat{\theta}_m(t_0)$ is estimated.

where $P_m(t) \in \Re^{3 \times 3}$ is the covariance matrix $$\dot{P}_m \triangleq -k_m \frac{P_m Y_f^T Y_f P_m}{1 + \gamma_m Y_f Y_f^T}, \quad P_m(t_0) = \rho_m I_3$$

where $k_m, \gamma_m, \rho_m \in \Re^+$ are constant gains.

From $\hat{\theta}_m$ and the estimate of the motor force constant from step 650, estimates of each unknown constant of the plurality of unknown constants of the mechanical dynamic model for linear compressor 100 may be given as $$\hat{M} = \hat{\alpha}\hat{\theta}_{m_1}, \hat{C} = \hat{\alpha}\hat{\theta}_{m_2}, \hat{K} = \hat{\alpha}\hat{\theta}_{m_3}.$$

With the unknown constants of the mechanical dynamic model for linear compressor 100 suitably estimated, a final estimate for each unknown constant of the plurality of unknown constants of the mechanical dynamic model for linear compressor 100 may be saved within the controller of linear compressor 100. The saved constant values may be used to facilitate efficient and/or proper operation of linear compressor 100. In particular, knowledge of the constants of the mechanical dynamic model for linear compressor 100 may assist with operating linear compressor 100 at a resonant frequency while avoiding head crashing and/or preventing part fatigue (e.g., extreme or excessive part fatigue loading).

Figure 7:
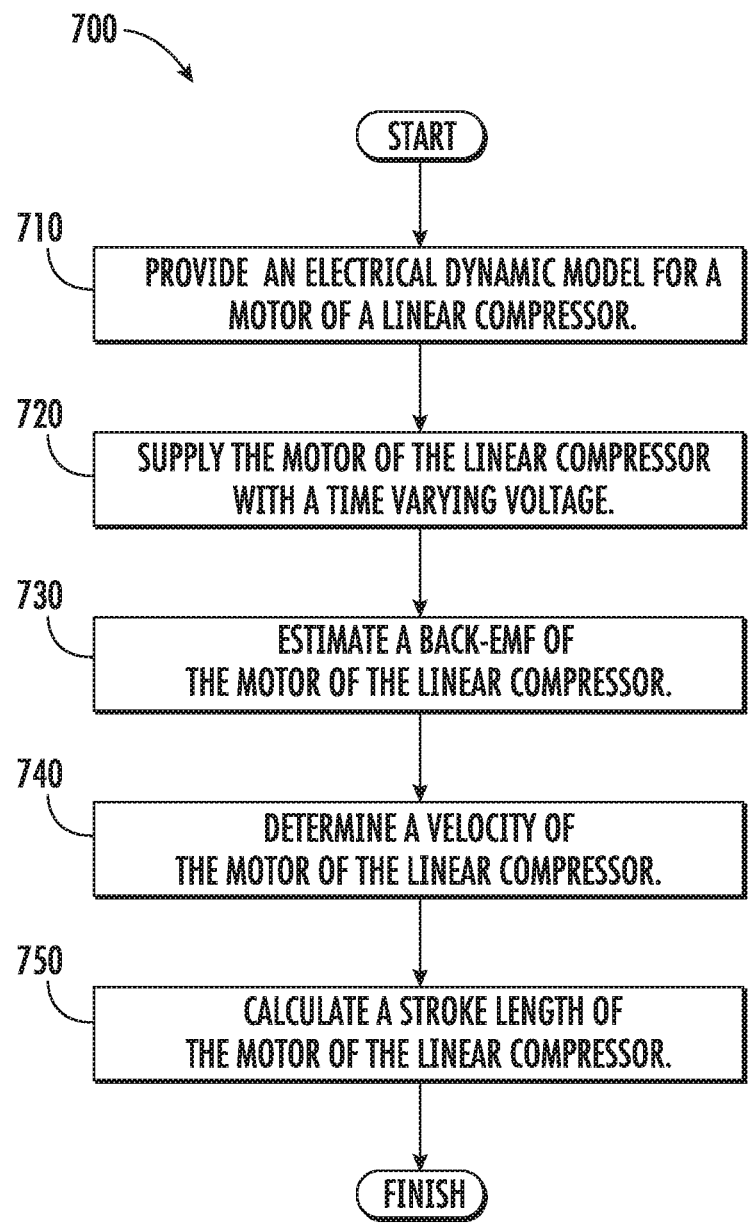
FIG. 7 provides a flow chart illustrating a method for operating a linear compressor according to another exemplary embodiment of the present disclosure.

FIG. 7 illustrates a method 700 for operating a linear compressor according to another exemplary embodiment of the present disclosure. Method 700 may be used to operate any suitable linear compressor. For example, method 700 may be used to operate linear compressor 100 (FIG. 3). Thus, method 700 is discussed in greater detail below with reference to linear compressor 100. Utilizing method 700, a stroke length of the motor of linear compressor 100 may be established or determined. Knowledge of the stroke length of the motor of linear compressor 100 may improve performance or operation of linear compressor 100, as will be understood by those skilled in the art.

At step 710, an electrical dynamic model for the motor of linear compressor 100 is provided. Any suitable electrical dynamic model for the motor of linear compressor 100 may be provided at step 710. For example, the electrical dynamic model for the motor of linear compressor 100 described above for step 610 of method 600 may be used at step 710. The electrical dynamic model for the motor of linear compressor 100 may also be modified such that $$\frac{di}{dt} = \frac{v_a}{L_i} - \frac{r_i i}{L_i} - f$$

where $f = \frac{\alpha}{L_i} \dot{x}$.

At step 720, the motor (e.g., driving coil 152) of linear compressor 100 is supplied with a time varying voltage, e.g., by the controller of linear compressor 100. Any suitable time varying voltage may be supplied to the motor of linear compressor 100 at step 720. As an example, the motor (e.g., driving coil 152) of linear compressor 100 may be supplied with a time varying voltage in the manner described above for step 630 of method 600. A time varying current through the motor of linear compressor 100 may also be determined, e.g., during step 720. An ammeter or any other suitable method or mechanism may be used to determine the time varying current through the motor of linear compressor 100.

At step 730, a back-EMF of the motor of linear compressor 100 is estimated, e.g., during step 720. The back-EMF of the motor of linear compressor 100 may be estimated at step 730 using at least the electrical dynamic model for the motor of linear compressor 100 and a robust integral of the sign of the error feedback. As an example, the back-EMF of the motor of linear compressor 100 may be estimated at step 730 by solving $$\hat{f} = (K_1 + 1)e(t) + \int_{t_0}^{t} [(K_1 + 1)e(\sigma) + K_2 \operatorname{sgn}(e(\sigma))] d\sigma - (K_1 + 1) e(t_0)$$

where $\hat{f}$ is an estimated back-EMF of the motor of linear compressor 100;

$K_1$ and $K_2$ are real, positive gains; and $e = \hat{i} - i$ and $\dot{e} = \hat{f} - \hat{f}$; and sgn is the signum or sign function.

At step 740, a velocity of the motor of linear compressor 100 is estimated. The velocity of the motor of linear compressor 100 may be estimated at step 740 based at least in part on the back-EMF of the motor from step 730. For example, the velocity of the motor of linear compressor 100 may be determined at step 740 by solving $$\hat{\dot{x}} = \frac{L_i}{\alpha} \hat{f}$$

where $\hat{\dot{x}}$ is an estimated velocity of the motor of linear compressor 100;

$\alpha$ is a motor force constant; and $L_i$ is an inductance of the motor of linear compressor 100.

The motor force constant and the inductance of the motor of linear compressor 100 may be estimated with method 600, as described above.

At step 750, a stroke length of the motor of linear compressor 100 is estimated. The stroke length of the motor of linear compressor 100 may be estimated at step 750 based at least in part on the velocity of the motor from step 740. In particular, the stroke length of the motor of linear compressor 100 may be estimated at step 750 by solving $$X = \frac{L_i}{\alpha} \int \hat{f} dt = \hat{x}_{initial} + \hat{x}(t)$$

where $\hat{x}$ is an estimated position of the motor of linear compressor 100.

It should be understood that steps 720, 730, 740 and 750 may be performed with the motor of linear compressor 100 sealed within a hermitic shell of linear compressor 100. Thus, method 700 may be performed at any suitable time during operation of linear compressor 100 in order to determine the stroke length of the motor of linear compressor 100, e.g., because moving components of linear compressor 100 need not be directly measured with a sensor. Knowledge of the stroke length of the motor of linear compressor 100 may assist with operating linear compressor 100 efficiently and/or properly. For example, such knowledge may assist with adjusting the time varying voltage supplied to the motor of the linear compressor 100 in order to operate the motor of linear compressor 100 at a resonant frequency of the motor of linear compressor 100 without head crashing and/or while preventing part fatigue (e.g., extreme or excessive part fatigue loading), etc., as will be understood by those skilled in the art.

Figure 8:
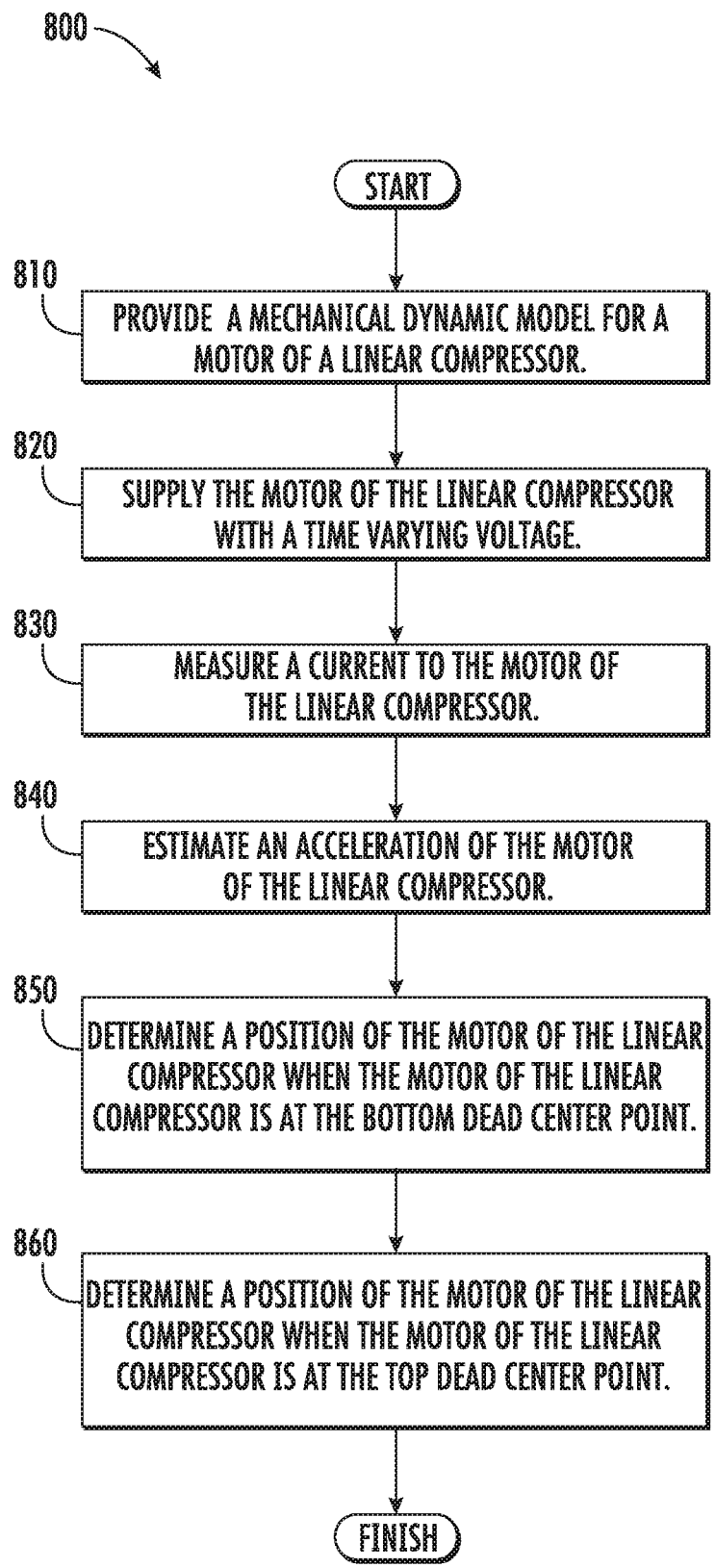
FIG. 8 provides a flow chart illustrating a method for operating a linear compressor according to an additional exemplary embodiment of the present disclosure.

FIG. 8 illustrates a method 800 for operating a linear compressor according to an additional exemplary embodiment of the present disclosure. Method 800 may be used to operate any suitable linear compressor. For example, method 800 may be used to operate linear compressor 100 (FIG. 3). Thus, method 800 is discussed in greater detail below with reference to linear compressor 100. Utilizing method 800, a position of the motor of linear compressor 100 when the motor of linear compressor 100 is at a top dead center point may be established or determined. Knowledge of the motor of linear compressor 100 at the top dead center point may improve performance or operation of linear compressor 100, as will be understood by those skilled in the art.

At step 810, a mechanical dynamic model for linear compressor 100 is provided. Any suitable mechanical dynamic model for linear compressor 100 may be provided. For example, the mechanical dynamic model for linear compressor 100 described above for method 600 may be used at step 810. As another example, the mechanical dynamic model for linear compressor 100 may be $$F_m = \alpha i = M\ddot{x} + C\dot{x} + K(x_{avg} - x_0) + F_{gas}$$

where

M is a moving mass of linear compressor 100;

$\alpha$ is a motor force constant;

$\ddot{x}$ is an acceleration of the motor of linear compressor 100;

C is a damping coefficient of linear compressor 100;

$\dot{x}$ is a velocity of the motor of linear compressor 100;

K is a spring stiffness of linear compressor 100;

x is a position of the moving mass of linear compressor 100; and $F_{gas}$ is a gas force.

Solving for acceleration, the mechanical dynamic model for linear compressor 100 may be given as $$\ddot{x} = -\frac{C}{M}\dot{x} - \frac{K}{M}(x_{avg} - x_0) + \frac{\alpha}{M}i + \frac{1}{M}F_{gas} = \frac{\alpha}{M}i + f_x(t)$$

where $$f_x(t) = \frac{1}{M}F_{gas} - \frac{C}{M}\dot{x} - \frac{K}{M}(x_{avg} - x_0) + \frac{\alpha}{M}i.$$

At step 820, the motor (e.g., driving coil 152) of linear compressor 100 is supplied with a time varying voltage, e.g., by the controller of linear compressor 100. Any suitable time varying voltage may be supplied to the motor of linear compressor 100 at step 820. As an example, the motor (e.g., driving coil 152) of linear compressor 100 may be supplied with a time varying voltage in the manner described above for step 630 of method 600. At step 830, a time varying current through the motor of linear compressor 100 may also be determined, e.g., during step 820. In particular, a current to the motor of linear compressor 100 may be measured at step 830 when the motor of linear compressor 100 is at a bottom dead center point. Thus, a velocity of the motor of linear compressor 100 may be zero or about (e.g., within about a tenth of a meter per second) zero when the current to the motor of linear compressor 100 is measured at step 830. A voltmeter or any other suitable method or mechanism may be used to determine the current through the motor of linear compressor 100.

At step 840, an acceleration of the motor of linear compressor 100 is estimated, e.g., during step 820. The acceleration of the motor of linear compressor 100 may be estimated at step 840 using at least the mechanical dynamic model for linear compressor 100 and a robust integral of the sign of the error feedback. As an example, the acceleration of the motor of linear compressor 100 may be estimated at step 840 by solving $$\hat{\ddot{x}} = \frac{\alpha}{M}i + \hat{f}_x(t)$$

with $\hat{f}_x$ being given as $$\hat{f}_x = (k_1+1)e_x(t) + \int_{t_0}^{t}[(k_1+1)e_x(\sigma) + k_2\,\mathrm{sgn}(e_x(\sigma))]d\sigma - (k_1+1)e_x(t_0)$$

and where $\hat{\ddot{x}}$ is an estimated acceleration of the motor of linear compressor 100;

$k_1$ and $k_2$ are real, positive gains; and $e_x = \dot{x} - \hat{\dot{x}}$ and $s_x = \dot{e}_x + e_x$.

At step 850, a position of the motor of linear compressor 100 when the motor of the linear compressor 100 is at the bottom dead center point is determined. The position of the motor of linear compressor 100 when the motor of linear compressor 100 is at the bottom dead center point may be estimated at step 850 based at least in part on the current to the motor of linear compressor 100 from step 830 and the acceleration of the motor from step 840. For example, the position of the motor of linear compressor 100 when the motor of linear compressor 100 is at the bottom dead center point may be estimated at step 850 by solving $$x_{BDC} = \frac{\alpha}{K}i_{BDC} - \frac{M}{K}\ddot{x}_{BDC}$$

where

α is a motor force constant;

K is a spring stiffness of linear compressor 100;

$i_{BDC}$ is the current to the motor of linear compressor 100 at the bottom dead center point;

M is a moving mass of linear compressor 100; and $\ddot{x}_{BDC}$ is the acceleration of the motor at the bottom dead center point.

The motor force constant, the spring stiffness of linear compressor 100 and the moving mass of linear compressor 100 may be estimated with method 600, as described above.

At step 860, a position of the motor of linear compressor 100 when the motor of linear compressor 100 is at the top dead center point is determined. The position of the motor of linear compressor 100 when the motor of linear compressor 100 is at the top dead center point may be estimated at step 860 based at least in part on the position of the motor of linear compressor 100 when the motor of linear compressor 100 is at the bottom dead center point from step 850 and a stroke length of the motor of linear compressor 100. For example, the position of the motor of linear compressor 100 when the motor of linear compressor 100 is at the top dead center point may be estimated at step 860 by solving $$x_{TDC} = x_{BDC} - SL$$

where SL is the stroke length of the motor of linear compressor 100.

The stroke length of the motor of linear compressor 100 may be estimated with method 700, as described above.

It should be understood that steps 820, 830, 840, 850 and 860 may be performed with the motor of linear compressor 100 sealed within a hermitic shell of linear compressor 100. Thus, method 800 may be performed at any suitable time during operation of linear compressor 100 in order to determine the position of the motor of linear compressor 100 when the motor of linear compressor 100 is at the top dead center point, e.g., because moving components of linear compressor 100 need not be directly measured with a sensor. Knowledge of the position of the motor of linear compressor 100 when the motor of linear compressor 100 is at the top dead center point may assist with operating linear compressor 100 efficiently and/or properly. For example, such knowledge may assist with adjusting the time varying voltage supplied to the motor of the linear compressor 100 in order to operate the motor of linear compressor 100 at a resonant frequency of the motor of linear compressor 100 without head crashing and/or while preventing part fatigue (e.g., extreme or excessive part fatigue loading), etc., as will be understood by those skilled in the art.

Figure 9:
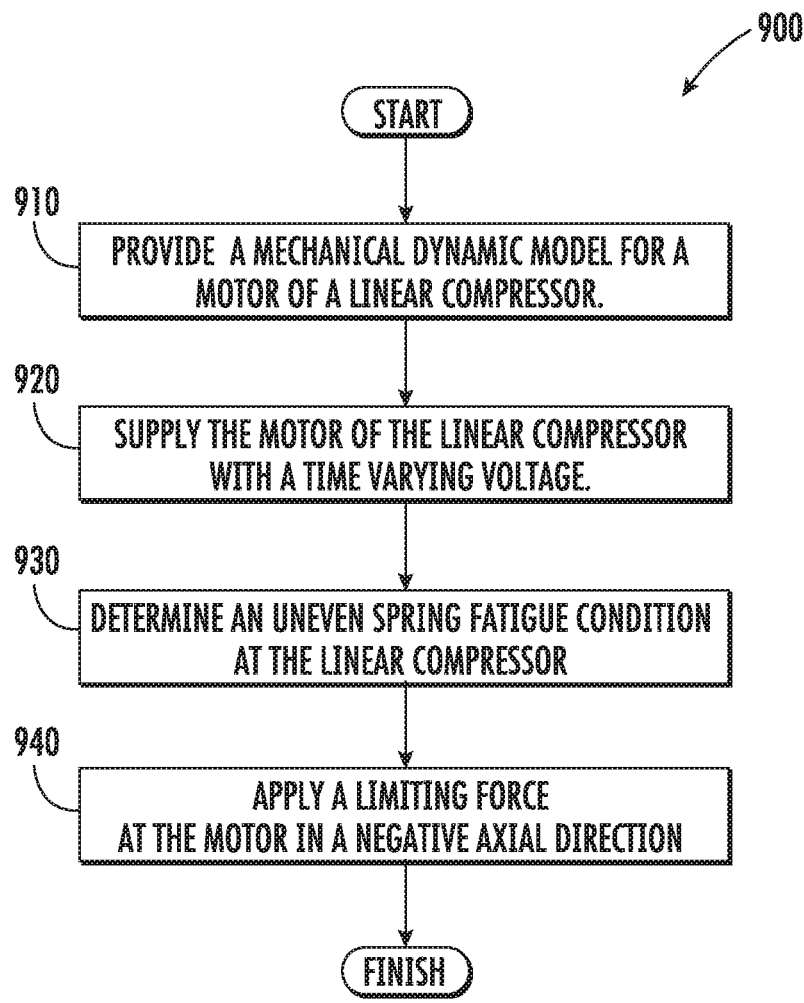
FIG. 9 provides a flow chart illustrating a method for operating a linear compressor according to a further exemplary embodiment of the present disclosure.

FIG. 9 illustrates a method 900 for operating a linear compressor according to a further exemplary embodiment of the present disclosure. Method 900 may be used to operate any suitable linear compressor. For example, method 900 may be used to operate linear compressor 100 (FIG. 3). Thus, method 900 is discussed in greater detail below with reference to linear compressor 100. Utilizing method 900, imbalances within linear compressor 100 (e.g., extreme or excessive extension of the spring assembly 120) may be notably reduced and fatigue (e.g., fatigue loads) may be advantageously limited, thereby improving reliability, performance, or operation of linear compressor 100.

At step 910, an electrical dynamic model for the motor of linear compressor 100 is provided. Any suitable electrical dynamic model for the motor of linear compressor 100 may be provided at step 910. For example, the electrical dynamic model for the motor of linear compressor 100 described above for step 610 of method 600, step 710 of method 700, and/or step 810 for method 800 may be used at step 910. As another example, the mechanical dynamic model for linear compressor 100 may be $$F_m = \alpha i = M\ddot{x} + C\dot{x} + K(x-L_0) - F_{gas}$$

where
M is a moving mass of linear compressor 100;
$\alpha$ is a motor force constant;
$\ddot{x}$ is an acceleration of the motor of linear compressor 100;
C is a damping coefficient of linear compressor 100;
$\dot{x}$ is a velocity of the motor of linear compressor 100;
K is a spring stiffness of linear compressor 100;
x is a position of the moving mass of linear compressor 100;
$L_0$ is a natural equilibrium point of linear compressor; and
$F_{gas}$ is a gas force.

At step 920, the motor (e.g., driving coil 152) of linear compressor 100 is supplied with a time varying voltage, e.g., by the controller of linear compressor 100. Any suitable time varying voltage may be supplied to the motor of linear compressor 100 at step 920. As an example, the motor (e.g., driving coil 152) of linear compressor 100 may be supplied with a time varying voltage in the manner described above for step 630 of method 600. A time varying current through the motor of linear compressor 100 may also be determined, e.g., during step 920. For instance, a time varying current may be determined in the manner described above for step 830 of method 800. Additionally or alternatively, an ammeter or any other suitable method or mechanism may be used to determine the time varying current through the motor of linear compressor 100.

At step 930, an uneven fatigue condition (i.e., condition at which uneven fatigue is possible or likely to occur) may be determined at linear compressor 100. For instance, an imbalance for oscillation of piston assembly 114 (e.g., affecting spring assembly 120) may be determined. Such an imbalance may be indicative of or indicated by extreme or excessive spring extension for spring assembly 120.

Figure 11:
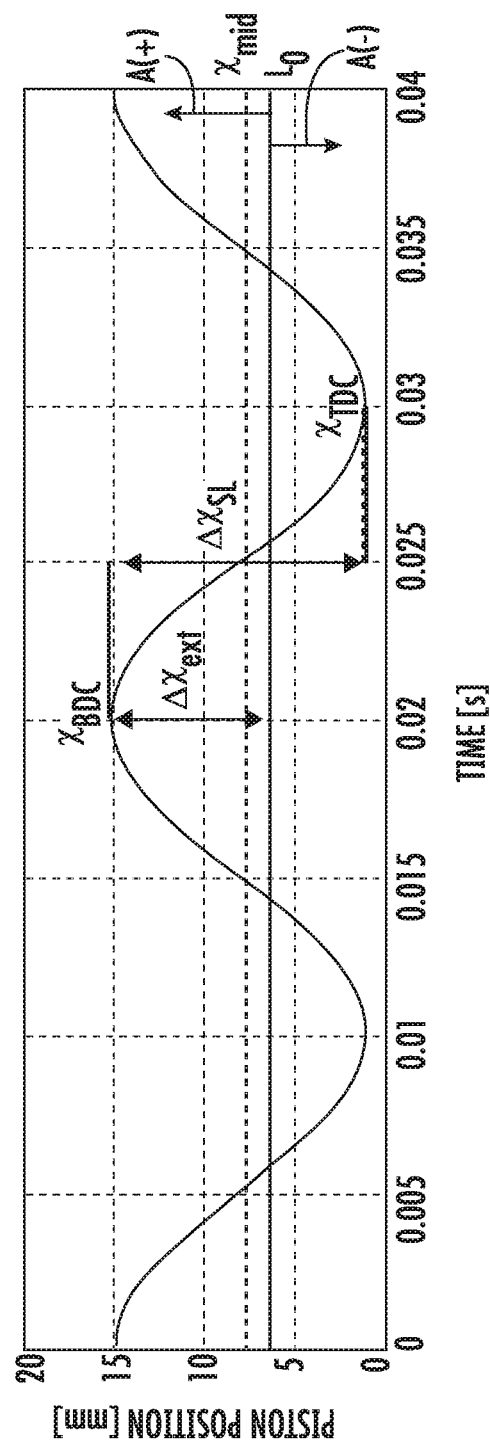
FIG. 11 provides exemplary movement plot of an experimental linear compressor model.

An example of an imbalance is illustrated generally at FIG. 11. In particular, FIG. 11 illustrates an exemplary movement plot of an experimental linear compressor model, e.g., taken during steps 920 and 930. As may be seen in FIG. 11, the movement or oscillation of piston assembly 114 may be plotted as a sinusoidal wave wherein x corresponds to piston assembly 114 position (i.e., relative to the chamber 112). Thus, the position at which x=0 is understood to correspond to the base portion of chamber 112 (e.g., a cylinder head). As shown, the sinusoidal wave is defined across one or more strokes of the piston assembly 114. Thus, the sinusoidal wave may be formed from one or more sinusoidal cycles defined by movement (e.g., of piston head 116) from a midpoint to a top dead center point, to a bottom dead center point, and back to the midpoint. The position $x_{mid}$ is the actual midpoint of the sinusoidal wave. In other words, $x_{mid}$ is the midpoint of stroke length (i.e., $\Delta x_{SL}$) between bottom dead center (i.e., $x_{BDC}$) and top dead center (i.e., $x_{TDC}$). In a free-floating or ideal system, piston assembly 114 would naturally oscillate about its equilibrium point $L_0$ (i.e., $x_{mid}=L_0$). However, pressure within the chamber 112 (e.g., $F_{gas}$) moves $x_{mid}$ upward in the positive axial direction A(+). In other words, extension of the piston assembly 114 in the positive axial direction A(+) is greater than extension in the negative axial direction A(−). An imbalanced extension (i.e., $\Delta x_{ext}$) may thus be determined. In some such embodiments, $\Delta x_{ext}$ is calculated as $$\Delta x_{ext} \triangleq x_{BDC} - L_0 \text{ or } \Delta x_{ext} \triangleq x_{TDC} + \Delta x_{SL} - L_0.$$

Returning to FIG. 9, in some embodiments, step 930 includes determining an axial movement threshold (e.g., axial movement toward BDC) has been exceeded at the piston assembly 114 as it reciprocates or oscillates. Such a determination may include measuring or estimating a contemporary axial movement value (e.g., as instantaneous value of $\Delta x_{ext}$ or $\Delta SL$ for a particular stroke of the piston assembly 114; as an average value of $\Delta x_{ext}$ or $\Delta SL$ for a predetermined period; or as another suitable value). For instance, measuring or estimating a contemporary axial movement value may include estimating the stroke length of the motor of linear compressor 100 with method 700, as described above. The axial movement threshold may be a predetermined value (e.g., stored within the controller). In some such embodiments, the contemporary axial movement value is compared directly to the axial movement threshold. A determination that the axial movement threshold is exceeded may thus indicate an undesirable fatigue loading has occurred or is likely to occur. Generally, the determination that the axial movement threshold has been exceeded may occur during an initial portion of step 920. In turn, step 920 may continue to supply the time varying voltage during and after step 930, e.g., such that the piston assembly 114 continues to reciprocate after the axial movement threshold has been exceeded.

In additional or alternative embodiments, step 930 includes determining a pressure threshold has been exceeded at the piston assembly 114 as it reciprocates or oscillates. Such a determination may include measuring or estimating a contemporary pressure or force value within linear compressor 100 (e.g., as a voltage value utilizing the method 700 or, alternatively, as another suitable value). The pressure threshold may be a predetermined value (e.g., stored within the controller). In some such embodiments, the contemporary pressure value is compared directly to the pressure threshold. A determination that the pressure threshold is exceeded may thus indicate an undesirable fatigue loading has occurred or is likely to occur. Generally, the determination that the pressure threshold has been exceeded may occur during an initial portion of step 920. In turn, step 920 may continue to supply the time varying voltage during and after step 930, e.g., such that the piston assembly 114 continues to reciprocate after the pressure threshold has been exceeded.

At step 940, a limiting force may be applied at the motor of the linear compressor 100 in response to a determination of the uneven spring condition (i.e., in response to step 930). In particular, the limiting force may be applied against the piston assembly 114 in the negative axial direction A(−) while the time varying voltage continues to be applied to the motor (i.e., during at least a portion of the continued step 920). In some embodiments, the limiting force of step 940 is induced by a supplemental direct current (DC) voltage to the motor (e.g., at linear compressor 100). Thus, step 940 may include directing a DC voltage to the motor. As induced by a negative DC voltage, the limiting force is thus applied in the negative axial direction A(−). Advantageously, the limiting force may adjust the midpoint of stroke length ($x_{mid}$) downward [i.e., in the negative axial direction A(−)] and toward the natural equilibrium ($L_0$). In some embodiments, the limiting force can prevent or restrict the linear compressor from continuing to exceed the axial movement threshold. In other words, the limiting force may be sufficient to restrict axial movement (e.g., toward BDC) below the axial movement threshold (e.g., predetermined axial movement threshold).

In certain exemplary embodiments, the DC voltage of step 940 may be directed continuously or constantly after the determination is made at step 930. Thus, the negative DC voltage may be a constant voltage that is applied during both the positive axial movement and negative axial movement of the piston assembly 114. Moreover, the negative DC voltage may be applied across a plurality of sinusoidal cycles (i.e., strokes) of the piston assembly 114 as it travels between bottom dead center ($x_{BDC}$) and top dead center ($x_{TDC}$). Notably, directing a constant DC voltage may preserve the existing harmonics for the sinusoidal motion within linear compressor 100.

In additional or alternative exemplary embodiments, the DC voltage of step 940 may be directed intermittently after the determination is made at step 930.

As another example, the intermittent DC voltage may be applied according to a set amplitude skew. In particular, the amplitude skew may increase the amplitude of sinusoidal motion for the linear compressor 100 in the negative axial direction A(−). The amplitude skew is applied across a plurality of sinusoidal cycles (i.e., strokes) of the piston assembly 114 as it travels between bottom dead center ($x_{BDC}$) and top dead center ($x_{TDC}$). Thus, the amplitude skew may increase half-cycle amplitude in the negative axial direction A(−), e.g., such that half-cycle amplitude in the negative axial direction A(−) (e.g., amplitude of movement below $L_0$) is greater than half-cycle amplitude in the positive axial direction A(+) (e.g., amplitude of movement above $L_0$).

As another example, the intermittent DC voltage may be applied according to a set phase skew. In particular, the phase skew may increase the wavelength of sinusoidal motion for the linear compressor 100 in the negative axial direction A(−). The phase skew is applied across a plurality of sinusoidal cycles (i.e., strokes) of the piston assembly 114 as it travels between bottom dead center ($x_{BDC}$) and top dead center ($x_{TDC}$). Thus, the phase skew may increase half-cycle wavelength in the negative axial direction A(−), e.g., such that half-cycle wavelength in the negative axial direction A(−) (e.g., wavelength or time of movement below $L_0$) is greater than half-cycle wavelength in the positive axial direction A(+) (e.g., wavelength or time of movement above $L_0$).

In some embodiments, the method 900 may continue after applying a limiting force at step 940 to adjust or correct the limiting force applied at the motor (e.g., as step 920 continues). For instance, the method 900 may further include evaluating whether the uneven fatigue condition is present after applying the limiting force (e.g., by repeating step 930).

If the fatigue condition is present, the limiting force may be increased (i.e., in response to an evaluation that the uneven fatigue condition is present). Optionally, the limiting force may be increased by a predetermined amount. For instance, the directed DC voltage may be increased by a predetermined voltage value. In other words, the magnitude of the directed DC voltage may be increased by the predetermined voltage value, such that the increased value has an absolute value that is greater than the original directed DC voltage. If the directed DC voltage is characterized as a negative value, the predetermined voltage value must also be characterized as a negative value. Increasing the magnitude of the directed DC voltage may thus increase the limiting force. In some such embodiments, the directed DC voltage is progressively indexed (e.g., such that the magnitude of the directed DC voltage is increased incrementally according to a predetermined feedback loop). Thus, the predetermined voltage value may be an index value. The method 900 may repeatedly evaluate whether the uneven fatigue condition is present and increase the directed DC voltage until one or more evaluations are made that the uneven fatigue condition is not present.

If the uneven fatigue condition is not present, the limiting force may be decreased (i.e., in response to an evaluation that the uneven fatigue condition is not present). Optionally, the limiting force may be decreased by a predetermined amount. For instance, the directed DC voltage may be decreased by a predetermined voltage value. In some such embodiments, the directed DC voltage is progressively indexed (e.g., decreased incrementally according to a predetermined feedback loop). Thus, the predetermined voltage value may be an index value. The method 900 may repeatedly evaluate whether the uneven fatigue condition is present and decrease the directed DC voltage until the directed voltage reaches zero or one or more evaluations are made that the uneven fatigue condition is present.

Figure 12:
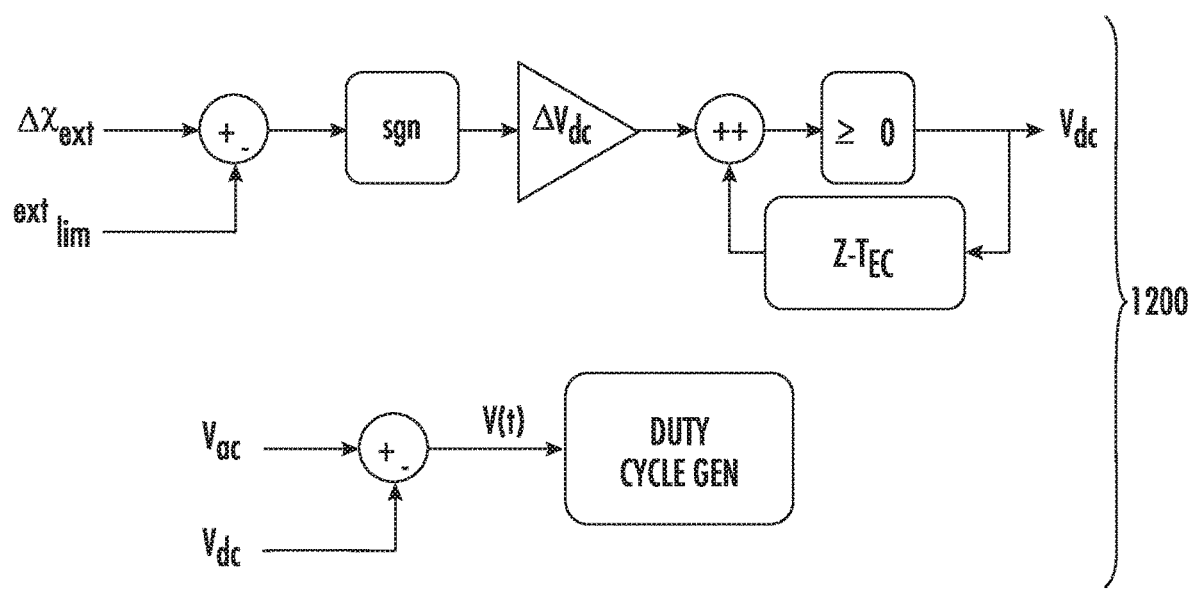
FIG. 12 illustrates a method for operating a linear compressor according to yet another exemplary embodiment of the present disclosure.

Turning now to FIG. 12, a method 1200 is illustrated for operating a linear compressor according to yet another exemplary embodiment of the present disclosure. Method 1200 may be used to operate any suitable linear compressor, such as linear compressor 100 (FIG. 3). Moreover, it is understood that the entirety (or a portion) of the method 1200 may be utilized as part of, or as an alternative to, any of the above-described methods. In particular, the method 1200 may be utilized for selectively supplying or directing a DC voltage as a time varying voltage is supplied to the motor of linear compressor 100. As described above (e.g., with respect to the method 900), the DC voltage may induce a limiting force in response to a determination of the uneven spring condition.

With respect to FIG. 12, the DC voltage is indicated as a variable value at $V_{dc}$. The time varying voltage is indicated at $V_{ac}$. A resulting applied voltage function for the combined DC voltage ($V_{dc}$) and time varying voltage ($V_{ac}$) is indicated at V(t), which controls a duty cycle generator to the motor. As discussed above, a value for a measured or estimated contemporary extension imbalance (i.e., distance between a natural equilibrium point and bottom dead center) is indicated at $\Delta x_{ext}$. An axial movement threshold (e.g., for extension imbalance) is indicated at $ext_{lim}$. An index value for the DC voltage is indicated at $\Delta V_{dc}$. An index limit for the combined DC voltage ($V_{dc}$) may be provided in some embodiments. For instance, a lower index limit, such as 0 (e.g., as shown at FIG. 12) may be provided. Additionally or alternatively, although not shown in FIG. 12, an upper index limit (e.g., between 2 Volts and 5 Volts) may be provided. An index rate (e.g., between 0.25 second and 1.5 seconds) is indicated at $T_{EC}$, such that a delay in the combined DC voltage ($V_{dc}$) is indicated at $Z^{-TEC}$.

As illustrated, at a determination may be made whether the contemporary extension imbalance ($\Delta x_{ext}$) exceeds the axial movement threshold ($ext_{lim}$). If the contemporary extension imbalance ($\Delta x_{ext}$) within method 1200 does exceed the axial movement threshold ($ext_{lim}$), the DC voltage ($V_{dc}$) is indexed higher (e.g., from a starting value of 0). In particular, the DC voltage ($V_{dc}$) is increased by the index value ($\Delta V_{dc}$). Moreover, the DC voltage ($V_{dc}$) is combined as a negative value with the time varying voltage ($V_{ac}$) to form the voltage function [V(t)]. If the contemporary extension imbalance ($\Delta x_{ext}$) continues to exceed the axial movement threshold ($ext_{lim}$), the DC voltage ($V_{dc}$) may be repeatedly increased by the index value ($\Delta V_{dc}$). Moreover, the repeated increases may occur at the index rate ($T_{EC}$) until the DC voltage ($V_{dc}$) exceeds the index limit (e.g., upper index limit) or the contemporary extension imbalance ($\Delta x_{ext}$) no longer exceeds the axial movement threshold ($ext_{lim}$).

If the contemporary extension imbalance ($\Delta x_{ext}$) within method 1200 does not exceed the axial movement threshold ($ext_{lim}$), the DC voltage ($V_{dc}$) is indexed lower (e.g., from a starting value above 0). In particular, the DC voltage ($V_{dc}$) is decreased by the index value ($\Delta V_{dc}$). Moreover, the DC voltage ($V_{dc}$) is combined as a negative value with the time varying voltage ($V_{ac}$) to form the voltage function [V(t)]. If the contemporary extension imbalance ($\Delta x_{ext}$) remains below the axial movement threshold ($ext_{lim}$), the DC voltage ($V_{dc}$) may be repeatedly decreased by the index value ($\Delta V_{dc}$). The repeated decreases may occur at the index rate ($T_{EC}$) until the DC voltage ($V_{dc}$) reaches the lower index limit (e.g., 0) or the contemporary extension imbalance ($\Delta x_{ext}$) exceeds the axial movement threshold (ext).

Figure 10:
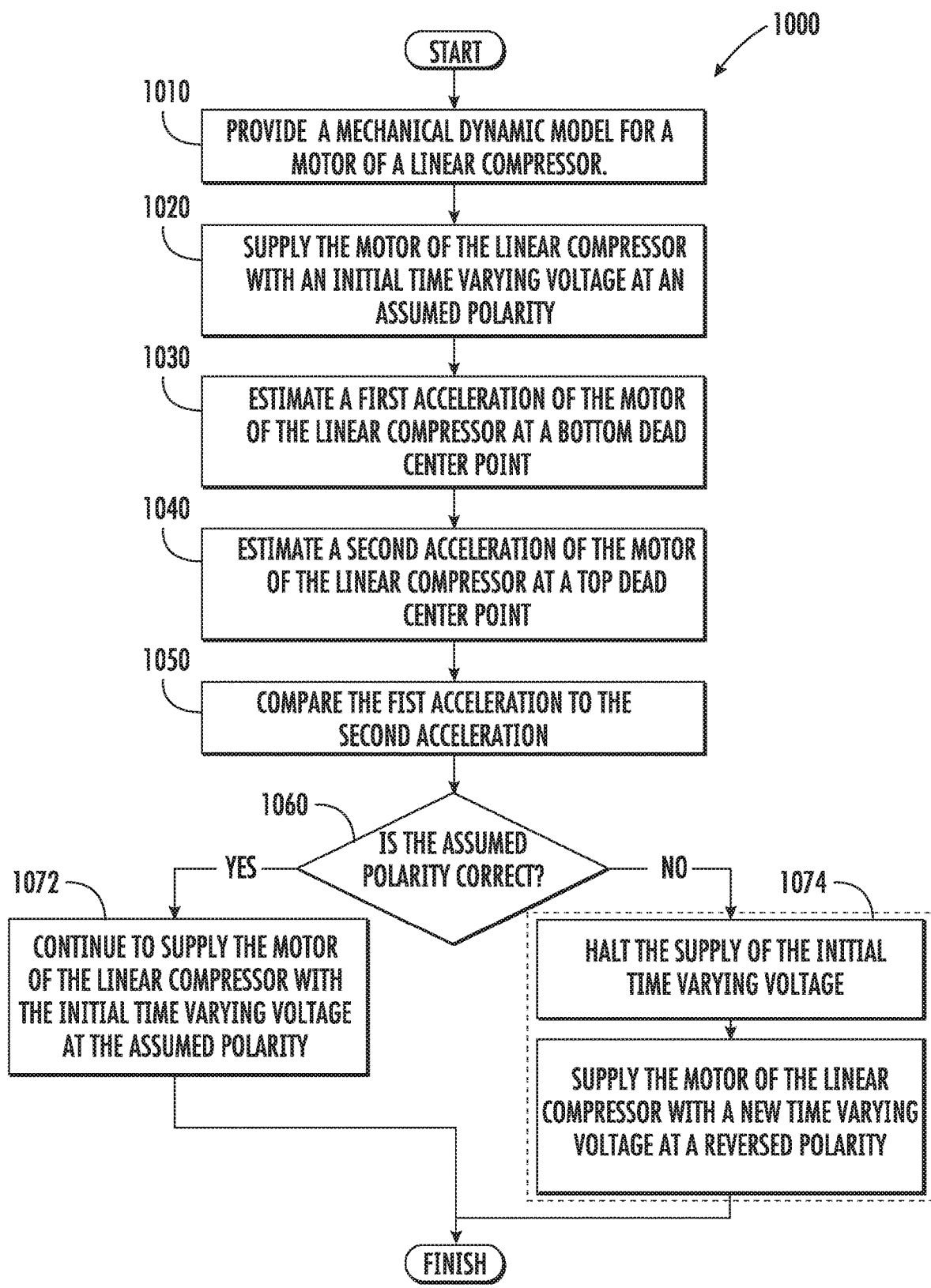
FIG. 10 provides a flow chart illustrating a method for operating a linear compressor according to a still further exemplary embodiment of the present disclosure.

FIG. 10 illustrates a method 1000 for operating a linear compressor according to a still further exemplary embodiment of the present disclosure. Method 1000 may be used to operate any suitable linear compressor. For example, method 1000 may be used to operate linear compressor 100 (FIG. 3). Thus, method 1000 is discussed in greater detail below with reference to linear compressor 100. Utilizing method 1000, a polarity or wiring direction for the motor of the linear compressor 100 may be known. Knowledge of the polarity of the motor of linear compressor 100 may assist with operating linear compressor 100 efficiently and/or properly. For example, such knowledge may assist with adjusting the time varying voltage supplied to the motor of the linear compressor 100 in order to operate the motor of linear compressor 100 at a resonant frequency of the motor of linear compressor 100 without head crashing and/or while preventing part fatigue (e.g., excessive part fatigue loading), etc., as will be understood by those skilled in the art. In certain embodiments, such knowledge may advantageously assist with directing a supplemental negative force to the motor, e.g., in order to reduce imbalances and fatigue (e.g., fatigue loading) within the motor of linear compressor 100.

At step 1010, an electrical dynamic model for the motor of linear compressor 100 is provided. Any suitable electrical dynamic model for the motor of linear compressor 100 may be provided at step 1010. For example, the electrical dynamic model for the motor of linear compressor 100 described above for step 610 of method 600, step 710 of method 700, step 810 for method 800, and/or step 910 for method 900 may be used at step 1010.

At step 1020, the motor (e.g., driving coil 152) of linear compressor 100 is supplied with a time varying voltage, e.g., by the controller of linear compressor 100. Any suitable time varying voltage may be supplied to the motor of linear compressor 100 at step 1020. As an example, the motor (e.g., driving coil 152) of linear compressor 100 may be supplied with a time varying voltage in the manner described above for step 630 of method 600. A time varying current through the motor of linear compressor 100 may also be determined, e.g., during step 1020. For instance, a time varying current may be determined in the manner described above for step 830 of method 800. Additionally or alternatively, an ammeter or any other suitable method or mechanism may be used to determine the time varying current through the motor of linear compressor 100.

At step 1030, a first acceleration of the motor of the linear compressor 100 may be estimated (e.g., during a portion of step 1020). In particular, the estimation may account for acceleration when the motor is at a bottom dead center position (i.e., $\ddot{x}_{BDC}$). In some embodiments, step 1030 includes calculating an acceleration value (e.g., first acceleration value) from the mechanical dynamic model of step 1010. For instance, an estimated value may be calculated as discussed above, e.g., according to step 840 of method 800. In additional or alternative embodiments, step 1030 includes calculating a slope value for velocity (e.g., a graphed velocity of the piston assembly 114) at the bottom dead center position, as would be understood in light of the present disclosure.

At step 1040, a second acceleration of the motor of the linear compressor 100 may be estimated (e.g., during a portion of step 1020). In particular, the estimation may account for acceleration when the motor is at a top dead center position (e.g., within the same sinusoidal cycle as step 1030) (i.e., $\ddot{x}_{TDC}$). In some embodiments, step 1040 includes calculating an acceleration value (e.g., second acceleration value) from the mechanical dynamic model of step 1010. For instance, an estimated value may be calculated as discussed above, e.g., according to step 840 of method 800. In additional or alternative embodiments, step 1040 includes calculating a slope value for velocity (e.g., a graphed velocity of the piston assembly 114) at the top dead center position, as would be understood in light of the present disclosure.

At step 1050, the first acceleration is compared to the second acceleration. In particular it may be determined if the magnitude of the first acceleration (i.e., absolute value of the first acceleration—$|\ddot{x}_{BDC}|$) is greater than the magnitude of the second acceleration (i.e., absolute value of the second acceleration—$|\ddot{x}_{TDC}|$). In some such embodiments, the magnitude of the first acceleration is directly compared to the magnitude of the second acceleration. In alternative embodiments, the magnitude of the first acceleration may be compared to a modified value of the second acceleration. For instance, the second acceleration may be modified (e.g., multiplied or divided by) a set margin of error (i.e., a). Thus, step 1050 may permit a determination of whether the first acceleration is either greater than the sum of the second acceleration and the set margin of error [i.e., if $|\ddot{x}_{BDC}|>|\ddot{x}_{TDC}|*(1+\sigma)$]. In certain embodiments, the set margin of error is five percent or greater (e.g., 5%, 10%, 15%, etc.).

At step 1060, it is determined whether the assumed polarity is correct based on the comparison. For instance, the assumed polarity may be determined to be incorrect (i.e., not correct) if the magnitude of the first acceleration exceeds the magnitude of the second acceleration by at least a certain amount (e.g., a set value or, alternatively, a relative value). A comparatively large deviation may indicate that the assumed polarity is incorrect, while a comparatively small deviation may indicate that the assumed polarity is correct. In some such embodiments, determining that the assumed polarity is correct includes determining that the first acceleration diverges from the second acceleration by less than the set margin of error [e.g., determining $|\ddot{x}_{BDC}|\leq|\ddot{x}_{TDC}|*(1+\sigma)$]. In other words, if the magnitude of the first acceleration is less than or equal to magnitude of the second acceleration plus the set margin of error, the assumed polarity may be determined to be correct. By contrast, in such embodiments, determining that the assumed polarity is not correct includes determining that the first acceleration diverges from the second acceleration by at least the set margin of error [e.g., determining $|\ddot{x}_{BDC}|>|\ddot{x}_{TDC}|*(1+\sigma)$]. In other words, if the magnitude of the first acceleration is greater than magnitude of the second acceleration plus the set margin of error, the assumed polarity may be determined to be incorrect.

Figure 13:
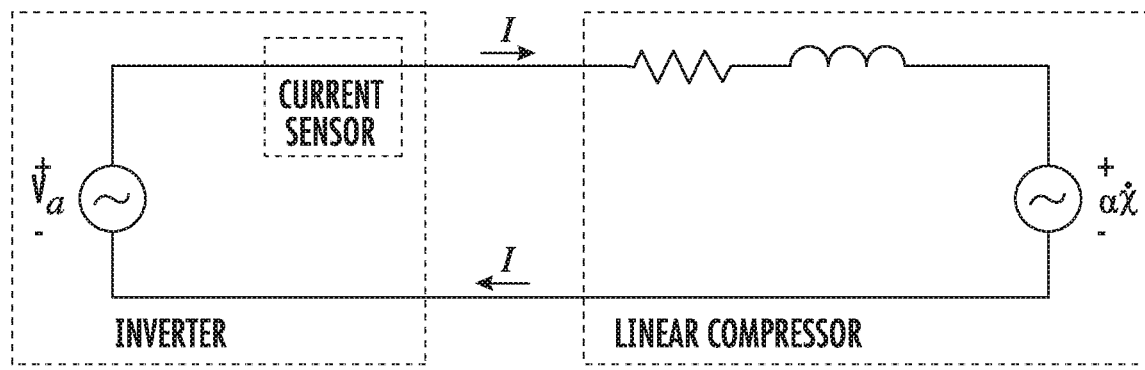
FIG. 13 provides a simplified schematic view of circuit wired in a first direction according to an exemplary embodiment of the present disclosure.
Figure 14:
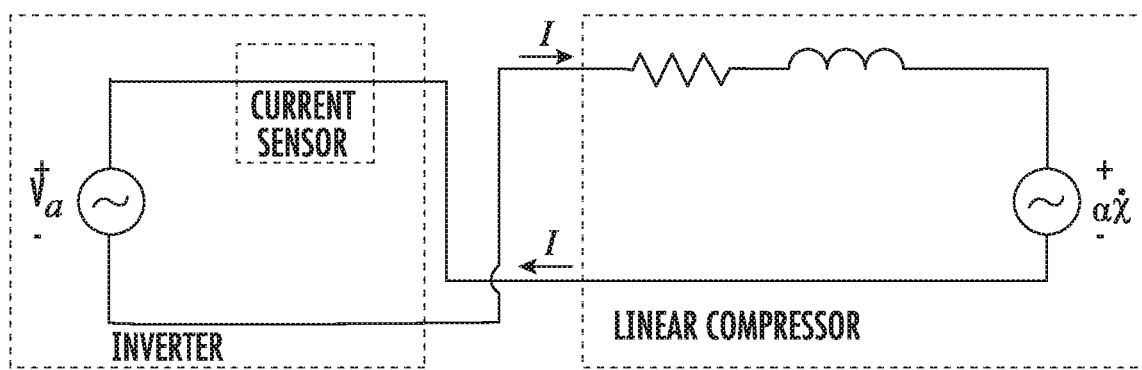
FIG. 14 provides a simplified schematic view of a circuit wires in a reversed direction according to an exemplary embodiment of the present disclosure.

Turning briefly to FIGS. 13 and 14, simplified schematic views of a wired circuit are illustrated. As shown, an inverter may be wired or connected in electrical communication with the linear compressor (e.g., linear compressor 100—FIG. 3) in a first direction (FIG. 13) or an opposite second direction (FIG. 14). The two directions are generally understood to provide a time varying voltage at opposite polarities. Generally, the first direction may be assumed. However, the second direction may be, e.g., inadvertently provided during assembly, thereby reversing the polarity of the system.

Thus, returning to FIG. 10, step 1060 may determine whether a system has been wired in the first direction or in the second direction. If the assumed polarity is determined to be correct or otherwise verified, the method 1000 may continue to step 1072. By contrast, if the assumed polarity is determined to be incorrect, the method 1000 may continue to step 1074.

At step 1072, the method 1000 generally includes permitting continued operation of the motor for the linear compressor 100. In particular, the time varying voltage initiated at 1020 may be sustained or perpetuated. Thus, step 1072 may include continuing to supply the motor of the linear compressor 100 with the initial time-varying voltage at the assumed polarity (e.g., until operation of the linear compressor 100 is completed or otherwise ended).

At step 1074, the method 1000 includes adjusting or changing the voltage to the motor of the linear compressor 100. In particular, the initial time varying voltage is halted at step 1074. Thus, the motor of the linear compressor 100 may be at least temporarily prevented from continuing to operate (e.g., oscillate piston assembly 114). Optionally, step 1074 may include supplying the motor of the linear compressor 100 with a new time varying voltage (e.g., until operation of the linear compressor 100 is completed or otherwise ended). The new time varying voltage will be provided at a reversed polarity from the assumed polarity of the initial time varying voltage. In some such embodiments, the new time varying voltage is equal (e.g., in amplitude and wavelength) to the initial time varying voltage. Additionally or alternatively, a previous current measurement may be negated at 1074. Optionally, a new current measurement may be obtained.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a linear compressor comprising a motor, the method comprising:
   supplying an initial time varying voltage to the motor of the linear compressor at an assumed polarity;
   estimating a first acceleration of the motor of the linear compressor when the motor is at a bottom dead center position;
   estimating a second acceleration of the motor of the linear compressor when the motor is at a top dead center position;
   comparing the first acceleration to the second acceleration;
   determining whether the assumed polarity is correct based on the comparison; and
   halting the supplying of the initial time varying voltage in response to determining the assumed polarity is not correct,
   wherein determining the assumed polarity is not correct comprises determining the first acceleration diverges from the second acceleration by at least a set margin of error for a plurality of sinusoidal cycles.

2. The method of claim 1, further comprising providing a mechanical dynamic model for the linear compressor; wherein estimating the first acceleration comprises calculating an acceleration value from the mechanical dynamic model.

3. The method of claim 1, wherein estimating the first acceleration comprises calculating a slope of velocity at the bottom dead center position.

4. The method of claim 1, further comprising:
   calculating a stroke length of the motor of the linear compressor; and
   determining the stroke length exceeds a stroke threshold,
   wherein estimating the first acceleration and estimating the second acceleration are initiated in response to determining the stroke length exceeds the stroke threshold.

5. The method of claim 1, further comprising:
   measuring a predetermined time period following an initiation of supplying the initial time varying voltage; and
   wherein estimating the first acceleration and estimating the second acceleration are initiated in response to expiration of the predetermined time period.

6. The method of claim 1, wherein the set margin of error is five percent or greater.

7. The method of claim 1, wherein each cycle of the plurality of sinusoidal cycles is consecutive.

8. The method of claim 1, further comprising supplying a new time varying voltage to the motor of the linear compressor at a modified polarity following the halting step, the modified polarity being reversed from the assumed polarity.

9. A method for operating a linear compressor comprising a motor, the method comprising:
   supplying an initial time varying voltage to the motor of the linear compressor at an assumed polarity;
   estimating a first acceleration of the motor of the linear compressor when the motor is at a bottom dead center position;
   estimating a second acceleration of the motor of the linear compressor when the motor is at a top dead center position;
   comparing the first acceleration to the second acceleration;
   determining whether the assumed polarity is correct based on the comparison, wherein determining the assumed polarity is correct comprises determining the first acceleration diverges from the second acceleration by less than a set margin of error, and wherein determining the assumed polarity is not correct comprises determining the first acceleration diverges from the second acceleration by at least the set margin of error; and
   halting the supplying of the initial time varying voltage in response to determining the assumed polarity is not correct,
   wherein determining the assumed polarity is not correct comprises determining the first acceleration diverges from the second acceleration by at least the set margin of error for a plurality of sinusoidal cycles.

10. The method of claim 9, further comprising providing a mechanical dynamic model for the linear compressor, wherein estimating the first acceleration comprises calculating an acceleration value from the mechanical dynamic model.

11. The method of claim 9, wherein estimating the first acceleration comprises calculating a slope of velocity at the bottom dead center position.

12. The method of claim 9, further comprising:
calculating a stroke length of the motor of the linear compressor; and
determining the stroke length exceeds a stroke threshold,
wherein estimating the first acceleration and estimating the second acceleration are initiated in response to determining the stroke length exceeds the stroke threshold.

13. The method of claim 9, further comprising:
measuring a predetermined time period following an initiation of supplying the initial time varying voltage; and
wherein estimating the first acceleration and estimating the second acceleration are initiated in response to expiration of the predetermined time period.

14. The method of claim 9, wherein the set margin of error is five percent or greater.

15. The method of claim 9, wherein each cycle of the plurality of sinusoidal cycles is consecutive.

16. The method of claim 9, further comprising supplying a new time varying voltage to the motor of the linear compressor at a modified polarity following the halting step, the modified polarity being reversed from the assumed polarity.

* * * * *